(12) United States Patent
Duan et al.

(10) Patent No.: US 12,276,391 B2
(45) Date of Patent: Apr. 15, 2025

(54) VEHICLE LIGHT MODULE, LIGHTING SYSTEM, AND VEHICLE

(71) Applicant: Shenzhen Yinwang Intelligent Technologies Co., Ltd., Shenzhen (CN)

(72) Inventors: Junke Duan, Dongguan (CN); Shengjun Liu, Dongguan (CN); Han Zhao, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/440,683

(22) Filed: Feb. 13, 2024

(65) Prior Publication Data
US 2024/0183511 A1    Jun. 6, 2024

Related U.S. Application Data

(63) Continuation of application No. PCT/CN2022/100690, filed on Jun. 23, 2022.

(30) Foreign Application Priority Data

Aug. 16, 2021   (CN) .......................... 202110939153.2

(51) Int. Cl.
*F21S 41/692*    (2018.01)
*F21S 41/43*     (2018.01)
*F21S 41/47*     (2018.01)

(52) U.S. Cl.
CPC ............. *F21S 41/692* (2018.01); *F21S 41/43* (2018.01); *F21S 41/47* (2018.01)

(58) Field of Classification Search
CPC ... F21S 41/692; F21S 41/43; F21S 41/68–698
See application file for complete search history.

(56) References Cited

U.S. PATENT DOCUMENTS

2017/0276312 A1    9/2017   Tanaka et al.

FOREIGN PATENT DOCUMENTS

| CN | 105059219 A | 11/2015 |
|---|---|---|
| CN | 109017541 A | 12/2018 |
| CN | 109073188 A | 12/2018 |
| CN | 109961653 A | 7/2019 |
| CN | 109964075 A | 7/2019 |

(Continued)

*Primary Examiner* — Sean P Gramling
(74) *Attorney, Agent, or Firm* — Leydig, Voit & Mayer, Ltd.

(57) ABSTRACT

A vehicle light module includes a light source assembly, a driving assembly, and a shielding assembly. The driving assembly is connected to the shielding assembly. The light source assembly is configured to send a first beam to the shielding assembly, where the shielding assembly is located on a transmission optical path of the first beam. The driving assembly is configured to drive, according to a driving instruction, the shielding assembly to move, to change a relative position between the shielding assembly and the first beam. A second beam emitted from the shielding assembly is displayed on a path around the vehicle in a target light pattern. The shielding assembly includes at least one movable member, at least a part of the first beam is illuminated on the at least one movable member, and a shape of a cross section of the second beam corresponds to the target light pattern.

16 Claims, 6 Drawing Sheets

(56) References Cited

FOREIGN PATENT DOCUMENTS

| | | | | |
|---|---|---|---|---|
| CN | 111692569 | A | 9/2020 | |
| CN | 107388150 | B * | 12/2020 | ............... B60Q 1/04 |
| CN | 112770939 | A | 5/2021 | |
| JP | 2010211404 | A | 9/2010 | |
| JP | 2017037806 | A | 2/2017 | |

\* cited by examiner

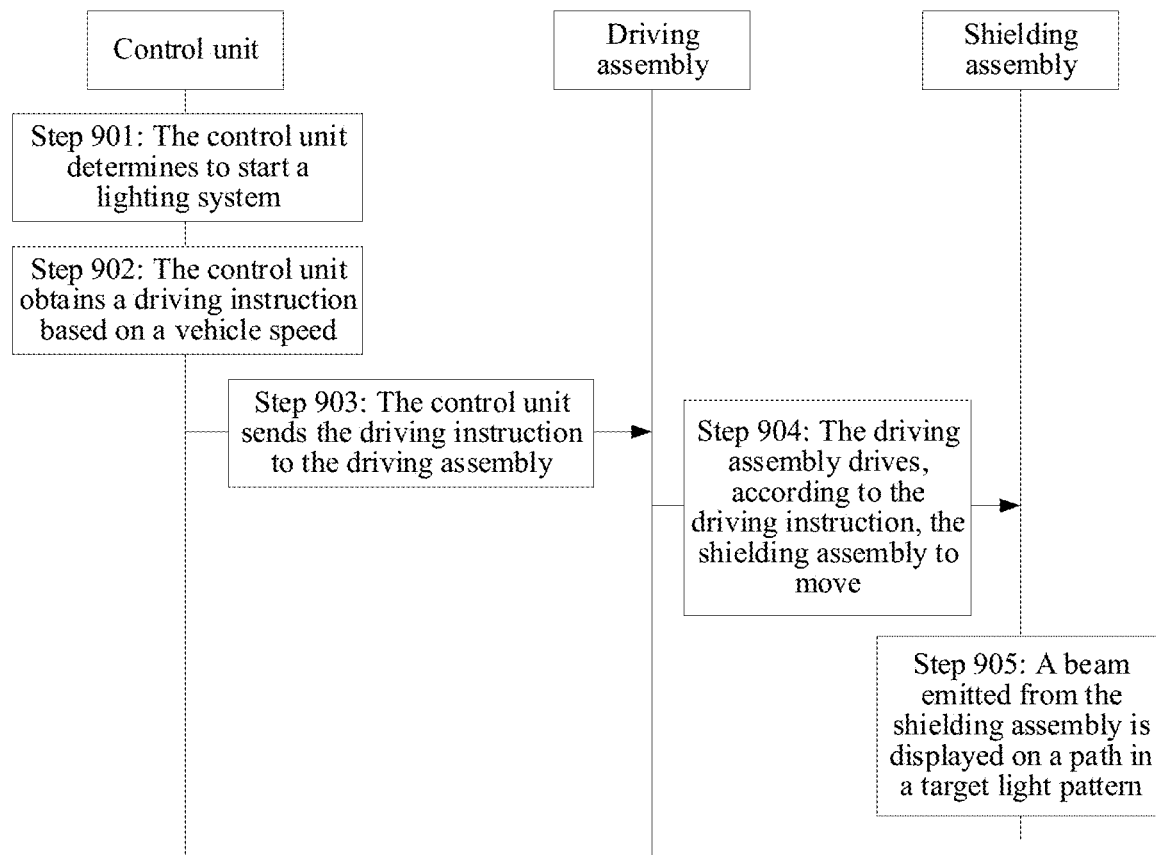
FIG. 9
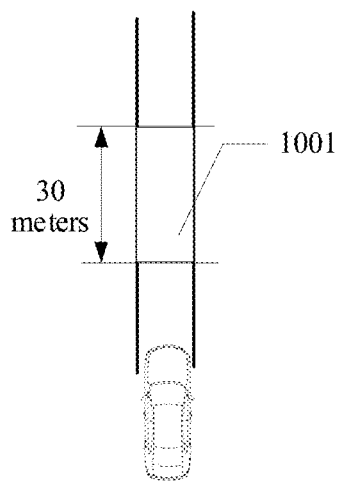
FIG. 10a
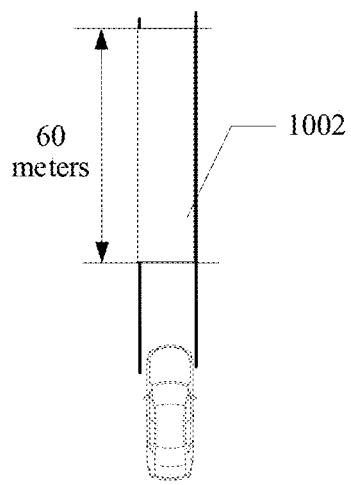
FIG. 10b
FIG. 10

VEHICLE LIGHT MODULE, LIGHTING SYSTEM, AND VEHICLE

CROSS-REFERENCE TO RELATED APPLICATIONS

This application is a continuation of International Application No. PCT/CN2022/100690, filed on Jun. 23, 2022, which claims priority to Chinese Patent Application No. 202110939153.2, filed on Aug. 16, 2021. The disclosures of the aforementioned applications are hereby incorporated by reference in their entireties.

TECHNICAL FIELD

This application relates to the field of autonomous driving, and in particular, to a vehicle light module, a lighting system, and a vehicle.

BACKGROUND

Vehicles all have indicator lamps, and the indicator lamps can implement corresponding indication functions. The vehicles may be autonomous vehicles (self-piloting automobile), also referred to as unmanned vehicles. The vehicles may alternatively be cars, trucks, motorcycles, public vehicles, mowers, entertainment vehicles, playground vehicles, trams, golf carts, trains, trolleys, or the like.

Existing indicator lamps of vehicles, such as a headlight, a taillight, or a turn light, each implement a single indication function, and can implement only a function of indication or illuminating a traveling path. In addition, an illumination range of light emitted by an existing indicator lamp is fixed, and adjustment for different illumination ranges based on different driving states of a vehicle cannot be implemented.

SUMMARY

Embodiments of this application provide a vehicle light module, a lighting system, and a vehicle, capable of implementing adjustment for different illumination ranges based on different driving states of the vehicle and improving functions implemented by vehicle light.

A first aspect of embodiments of this application provides a vehicle light module, where the vehicle light module includes a light source assembly, a driving assembly, and a shielding assembly. The driving assembly is connected to the shielding assembly. The light source assembly is configured to send a first beam to the shielding assembly, where the shielding assembly is located on a transmission optical path of the first beam. The driving assembly is configured to drive, according to a driving instruction, the shielding assembly to move, to change a relative position between the shielding assembly and the first beam. A second beam emitted from the shielding assembly is displayed on a path around a vehicle in a target light pattern. The shielding assembly includes at least one movable member, at least a part of the first beam is illuminated on the movable member, and a shape of a cross section of the second beam corresponds to the target light pattern.

It can be learned that the driving assembly can drive, according to the driving instruction, the shielding assembly to move, to change the target light pattern. Because the driving instruction corresponds to at least one of the following: navigation information, driving assistance information, or head unit data of the vehicle, it can be learned that a driver, a pedestrian around the vehicle, or another vehicle can recognize at least one of the navigation information, the driving assistance information, or the head unit data of the vehicle based on the target light pattern, thereby improving driving safety and efficiency. In addition, in this aspect, a quantity and relative positions of movable members included in the shielding assembly may be set based on possible light patterns of the target light pattern, to adjust the target light pattern based on a requirement. It should be understood that the target light pattern represents a shape and a dimension of light displayed on the ground, and target light patterns having different lengths, widths, bending, or the like are different target light patterns from each other.

Based on the first aspect, in an optional implementation, different relative positions between the shielding assembly and the first beam correspond to different target light patterns displayed on the path for the second beam emitted by the light module, and the different target light patterns may be at least one of the following:

a form (for example, a rectangle or an arc) of the target light pattern, a length of the target light pattern, a width of the target light pattern, a bending direction of the target light pattern, bending of the target light pattern, or the like.

It can be learned that different target light patterns are used to implement indication of different navigation information, driving assistance information, or head unit data, thereby improving driving safety, and improving efficiency of indicating the navigation information, the driving assistance information, or the head unit data to the driver. The navigation information includes a series of plane coordinates for the vehicle to reach a navigation destination. The driving assistance information is information from an advanced driving assistance system (ADAS) of the vehicle. For example, the driving assistance information may be a driving intention, and the driving intention may be to go straight, change lanes, turn or enter a fork in the road. The driving assistance information may alternatively be an emergency decision, and the emergency decision may be emergency braking, emergency avoidance, a vehicle fault, or the like. The driving assistance information may alternatively be a vehicle driving predetermining event, and the vehicle driving predetermining event may be that the vehicle is in a safe state, the vehicle is in a dangerous state, or the like. The head unit data may be main data (such as fuel consumption, an engine rotational speed, and a temperature), vehicle speed information, steering wheel angle information, or vehicle body attitude data on a vehicle dashboard, or the like.

Based on the first aspect, in an optional implementation, the shielding assembly includes a first movable member, a second movable member and a third movable member. The first movable member and the third movable member are located on two sides of the first beam, and the second movable member is located between the first movable member and the third movable member.

It can be learned that, the first movable member, the second movable member, and the third movable member have different relative positions with the first beam, so that the cross section of the second beam emitted from the shielding assembly has different shapes, thereby adjusting different target light patterns.

Based on the first aspect, in an optional implementation, the shielding assembly includes a first movable member, a second movable member, a third movable member, and a fourth movable member. Different relative positions between the first movable member and the third movable member and the first beam correspond to different widths of the target light pattern, and different relative positions between the second movable member and the fourth movable member correspond to different lengths of the target light pattern.

It can be learned that the first movable member, the second movable member, the third movable member, and the fourth movable member have different relative positions with the first beam, to adjust a length and a width of the target light pattern, thereby implementing indication of different driving trigger events.

Based on the first aspect, in an optional implementation, the driving assembly is configured to drive the first movable member and the third movable member to move, and ensures that an included angle between the first movable member and the second movable member remains unchanged in a moving process, and ensures that an included angle between the third movable member and the second movable member remains unchanged.

It can be learned that, in this aspect, it can be ensured that the target light pattern is in a stable changing state in a vehicle driving process, thereby avoiding interference caused by a sudden change of the target light pattern to a driver, a pedestrian, or another vehicle.

Based on the first aspect, in an optional implementation, an overlapping area between the second movable member and a cross section of the first beam corresponds to a length of the target light pattern.

It can be learned that, when the length of the target light pattern needs to be changed, the driving assembly directly adjusts the relative position between the second movable member and the first beam, to change the overlapping area between the second movable member and the cross section of the first beam, thereby changing the length of the target light pattern, and improving flexibility and efficiency of adjusting the length of the target light pattern.

Based on the first aspect, in an optional implementation, the cross section of the second beam is trapezoidal, and the driving assembly is configured to change, by adjusting a position of the second movable member, a height of the trapezoid formed by the cross section of the second beam emitted from the shielding assembly. The height of the trapezoid is in a positive correlation with the length of the target light pattern. In other words, a higher trapezoid indicates a longer target light pattern, and a lower trapezoid indicates a shorter target light pattern.

Based on the first aspect, in an optional implementation, the driving assembly may move the first movable member and/or the third movable member left or right along a direction perpendicular to the first beam emitted by the light source assembly, and/or the driving assembly may move the first movable member and/or the third movable member forward or backward along a transmission direction of the first beam emitted by the light source assembly, to adjust a width and/or a bending direction of the target light pattern.

It can be learned that, in this aspect, a manner of moving the first movable member and/or the third movable member may be determined based on a specific physical structure of the vehicle light module, to ensure that a process of changing a width and/or a bending direction of the target light pattern is not limited by the physical structure of the vehicle light module. Specifically, if space of the vehicle light module along a direction perpendicular to the first beam emitted by the light source assembly is large, the driving assembly may adjust the width and/or the bending direction of the target light pattern in a manner of moving the first movable member and/or the third movable member left or right along the direction perpendicular to the first beam emitted by the light source assembly. If the space of the vehicle light module along a transmission direction of the first beam emitted by the light source assembly is large, the driving assembly may adjust the width and/or the bending direction of the target light pattern in a manner of moving the first movable member and/or the third movable member forward or backward along the transmission direction of the first beam emitted by the light source assembly.

Based on the first aspect, in an optional implementation, the driving assembly may move the second movable member up or down along the direction perpendicular to the first beam emitted by the light source assembly, or the driving assembly may move the second movable member forward or backward along the transmission direction of the first beam emitted by the light source assembly.

It can be learned that, in this aspect, a manner of moving the second movable member may be determined based on a specific physical structure of the vehicle light module, to ensure that a process of changing a length of the target light pattern is not limited by the physical structure of the vehicle light module. Specifically, if space of the vehicle light module along the direction perpendicular to the first beam emitted by the light source assembly is large, the driving assembly may move the second movable member up or down along the direction perpendicular to the first beam emitted by the light source assembly, to adjust the length of the target light pattern. If the space of the vehicle light module along the transmission direction of the first beam emitted by the light source assembly is large, the driving assembly may move the second movable member forward or backward along the transmission direction of the first beam emitted by the light source assembly, to adjust the length of the target light pattern.

Based on the first aspect, in an optional implementation, a sum of an overlapping area between the first movable member and the cross section of the first beam and an overlapping area between the third movable member and the cross section of the first beam corresponds to a width of the target light pattern.

It can be learned that, in this aspect, at least one of the overlapping areas between the cross section of the first beam and the first movable member and the overlapping area between the cross section of the first beam and the third movable member may be adjusted, to implement a manner of adjusting the width of the target light pattern.

Based on the first aspect, in an optional implementation, only the overlapping area between the first movable member and the cross section of the first beam is adjusted. In this case, the overlapping area between the first movable member and the cross section of the first beam is in a negative correlation with the width of the target light pattern. In other words, a larger overlapping area between the first movable member and the cross section of the first beam indicates a smaller width of the target light pattern, and a smaller overlapping area between the first movable member and the cross section of the first beam indicates a larger width of the target light pattern.

Based on the first aspect, in an optional implementation, only the overlapping area between the third movable member and the cross section of the first beam is adjusted. In this case, the overlapping area between the third movable member and the cross section of the first beam is in a negative correlation with the width of the target light pattern. In other words, a larger overlapping area between the third movable member and the cross section of the first beam indicates a smaller width of the target light pattern, and a smaller overlapping area between the third movable member and the cross section of the first beam indicates a larger width of the target light pattern.

Based on the first aspect, in an optional implementation, the width of the target light pattern is adjusted in a manner of simultaneously adjusting the overlapping area between the first movable member and the cross section of the first beam and the overlapping area between the third movable member and the cross section of the first beam. In this case, a sum of the overlapping area between the first movable member and the cross section of the first beam and the overlapping area between the third movable member and the cross section of the first beam is in a negative correlation with the width of the target light pattern.

Based on the first aspect, in an optional implementation, the width of the target light pattern is in a positive correlation with a distance between the first movable member and the third movable member. In other words, if the first movable member and the third movable member move towards each other so that the distance between the first movable member and the third movable member is shortened, the width of the target light pattern is smaller. Similarly, if the first movable member and the third movable member move oppositely, so that the distance between the first movable member and the third movable member becomes larger, the width of the target light pattern is larger. The width of the target light pattern is adjusted by adjusting the distance between the first movable member and the third movable member, thereby improving accuracy of the adjustment.

Based on the first aspect, in an optional implementation, a relative position between the first movable member and the third movable member corresponds to a bending direction of the target light pattern.

It can be learned that, in this aspect, the bending direction of the target light pattern can be adjusted. For example, in a vehicle turning process, the target light pattern can match a route to be traveled along by the vehicle, to improve driving safety.

Based on the first aspect, in an optional implementation, the overlapping area between the second movable member and the cross section of the first beam is in a negative correlation with the length of the target light pattern.

It can be learned that a larger overlapping area between the second movable member and the cross section of the first beam indicates a shorter target light pattern, and a smaller overlapping area between the second movable member and the cross section of the first beam indicates a longer target light pattern, thereby improving accuracy of adjusting the length of the target light pattern.

Based on the first aspect, in an optional implementation, the target light pattern corresponds to a driving trigger event, and the driving trigger event includes at least one of the following: navigation information, driving assistance information, and head unit data.

It can be learned that the target light pattern described in this aspect can indicate a plurality of driving trigger events to improve driving safety, and can effectively assist a driver in driving.

Based on the first aspect, in an optional implementation, the target light pattern corresponds to a driving trigger event, and the driving trigger event is at least one of the following:
 a form of a route to be traveled along by the vehicle, a dimension of the route to be traveled along by the vehicle, a driving decision of an advanced driving assistance system (ADAS) of the vehicle, a brightness of an environment in which the vehicle is located, or a distance between the vehicle and a neighboring vehicle.

It can be learned that the target light pattern described in this aspect can indicate a plurality of types of information, thereby improving diversity and efficiency of indications.

Based on the first aspect, in an optional implementation, the overlapping area between the second movable member and the cross section of the first beam is in a negative correlation with a vehicle speed.

It can be learned that the target light pattern described in this aspect can effectively indicate a vehicle speed to a driver, a pedestrian, or another vehicle. In addition, a larger overlapping area between the second movable member and the cross section of the first beam indicates a lower vehicle speed indicated by the target light pattern, and a smaller overlapping area between the second movable member and the cross section of the first beam indicates a higher vehicle speed indicated by the target light pattern. It can be learned that the vehicle speed can be indicated based on the length of the target light pattern.

Based on the first aspect, in an optional implementation, the sum of the overlapping area between the first movable member and the cross section of the first beam and the overlapping area between the third movable member and the cross section of the first beam is in a negative correlation with a vehicle speed.

It can be learned that a greater sum of the overlapping area between the first movable member and the cross section of the first beam and the overlapping area between the third movable member and the cross section of the first beam indicates a lower vehicle speed indicated by the target light pattern, and a smaller sum of the overlapping area between the first movable member and the cross section of the first beam and the overlapping area between the third movable member and the cross section of the first beam indicates a higher vehicle speed indicated by the target light pattern. It can be learned that based on the width of the target light pattern, the vehicle speed can be indicated.

Based on the first aspect, in an optional implementation, the target light pattern corresponds to a driving trigger event, the driving trigger event is that there is a to-be-recognized object around the vehicle, the target light pattern covers at least a target region, and the target region is a region occupied by the to-be-recognized object.

It can be learned that when the to-be-recognized object exists on the route to be traveled along by the vehicle, the vehicle may illuminate the to-be-recognized object by using the target light pattern formed by the emitted second beam. The vehicle can recognize the illuminated to-be-recognized object, to recognize a specific type, so that the vehicle performs a corresponding driving decision, or a driver of the vehicle drives the vehicle based on the illuminated to-be-recognized object to achieve avoidance, or the like, thereby improving safety of driving the vehicle in a scenario in which there is the to-be-recognized object in front of the vehicle.

Based on the first aspect, in an optional implementation, the light module further includes a lens group. The cross section of the second beam emitted from the shielding assembly is trapezoidal. The lens group is located on a transmission optical path of the second beam emitted from the shielding assembly. The lens group is configured to display the second beam from the shielding assembly on the path in the target light pattern, and the target light pattern is rectangular.

It can be learned that the lens group can adjust the optical path of the second beam emitted from the shielding assembly, to ensure that the second beam can be accurately transmitted to the path and displayed on the path in a manner of the target light pattern, thereby improving accuracy of adjusting the target light pattern.

Based on the first aspect, in an optional implementation, a distance between the light source assembly and the lens group is greater than an equivalent focal length of the lens group.

It can be learned that, when the distance between the light source assembly and the lens group is greater than the equivalent focal length of the lens group, it is effectively ensured that after the first beam emitted by the light source assembly passes through the lens group, an inverted and enlarged real image is formed, thereby ensuring definition of the target light pattern displayed on the path.

Based on the first aspect, in an optional implementation, the trapezoid has a top side and a bottom side, a length of the top side is greater than a length of the bottom side, and an included angle between the first movable member and the second movable member and an included angle between the third movable member and the second movable member are both equal to an included angle between a lateral side and the top side of the trapezoid.

It can be learned that, when the cross section of the second beam emitted from the shielding assembly is trapezoidal, it can be effectively ensured that the second beam emitted from the shielding assembly can be displayed as a rectangular target light pattern on the path. When the vehicle is to go straight, the rectangular target light pattern can match a lane line which the vehicle is to travel along, thereby improving driving safety of a driver in a scenario such as navigation.

Based on the first aspect, in an optional implementation, the driving assembly adjusts the included angle between the first movable member and the second movable member and the included angle between the third movable member and the second movable member, to adjust the included angle between the lateral side and the top side of the trapezoid formed by the cross section of the second beam emitted from the shielding assembly.

It can be learned that the included angle between the lateral side and the top side of the trapezoid formed by the cross section of the second beam emitted from the shielding assembly is adjusted, to ensure that the target light pattern displayed on the path of the second beam emitted from the shielding assembly is of a rectangular structure.

Based on the first aspect, in an optional implementation, the light module further includes a reflector. The cross section of the second beam emitted from the shielding assembly is rectangular. The reflector is located on the transmission optical path of the second beam emitted from the shielding assembly. The reflector is configured to display the second beam from the shielding assembly on the path in the target light pattern, and the target light pattern is rectangular.

Based on the reflector, it can be effectively ensured that the second beam emitted from the shielding assembly can be successfully transmitted to the path, to display the target light pattern, thereby improving a success rate of displaying the target light pattern.

Based on the first aspect, in an optional implementation, the light module further includes the lens group. The lens group may be located between the shielding assembly and the reflector, or the lens group is located between the lens group and a light outlet of the light module.

It can be learned that the lens group can ensure that after the second beam emitted by the light source assembly passes through the lens group, an enlarged real image is formed on the path, thereby ensuring definition of the target light pattern.

Based on the first aspect, in an optional implementation, a reflection surface of the reflector is an arbitrarily curved surface.

It can be learned that accuracy of the target light pattern and a success rate of imaging of the target light pattern are improved by using the reflector of which the reflection surface is the arbitrarily curved surface.

Based on the first aspect, in an optional implementation, the light source assembly includes a light source. The light source may be a halogen lamp, a light-emitting diode (LED), a laser, an ultra-high pressure mercury lamp, a xenon lamp, or the like. The light source assembly further includes a driving unit connected to the light source, where the driving unit is configured to drive the light source to emit light. The light source assembly may further include a light homogenizing member. The light homogenizing member is located on the transmission optical path of the first beam emitted by the light source. The light homogenizing member is configured to receive the first beam from the light source, homogenize the first beam and then send the second beam to the shielding assembly. The light homogenizing member may be an optical device made of a fluorescent material, a light rod, a compound eyes lens, an optical waveguide, an optical fiber, a transmission module of which each peripheral surface is covered with a reflector and which is hollow; or the like.

It can be learned that, by using the light source assembly described in this aspect, it can be ensured that the first beam emitted by the light source assembly is in a state in which a light field is uniformly distributed, thereby ensuring uniform brightness of emitted light of the vehicle light.

Based on the first aspect, in an optional implementation, the vehicle light module may be located in the front of the vehicle, to display the target light pattern on a path in front of the vehicle; and/or the vehicle light module may be located on a side (for example, a left side or a right side) of the vehicle, to display the target light pattern on a side of the vehicle; and/or the vehicle light module may be located at the rear of the vehicle, to display the target light pattern behind the vehicle.

It can be learned that the vehicle described in this aspect may display the target light pattern at any position around the vehicle based on a requirement for displaying the target light pattern at different positions, so that flexibility of displaying the target light pattern is improved.

Based on the first aspect, in an optional implementation, the driving instruction is obtained based on a preset list, and the preset list includes a correspondence between a vehicle speed range and a length range of the target light pattern.

It can be learned that, in this aspect, different lengths of the target light pattern can be obtained based on the preset list and different vehicle speeds of the vehicle, and then the length of the target light pattern is adjusted, to ensure that the length of the target light pattern can effectively indicate the vehicle speed of the vehicle.

Based on the first aspect, in an optional implementation, if the vehicle speed range is greater than 0 and less than 20 km/h, the length range of the target light pattern is greater than 0 and less than 10 meters. If the vehicle speed range is greater than or equal to 20 km/h and less than 40 km/h, the length range of the target light pattern is greater than or equal to 10 meters and less than 20 meters. If the vehicle speed range is greater than or equal to 40 km/h and less than 60 km/h, the length range of the target light pattern is greater than or equal to 20 meters and less than 40 meters. If the vehicle speed range is greater than or equal to 60 km/h and less than 80 km/h, the length range of the target light pattern is greater than or equal to 40 meters and less than 50 meters. If the vehicle speed range is greater than or equal to 80 km/h and less than 120 km/h, the length range of the target light pattern is greater than or equal to 50 meters and less than 60 meters. If the vehicle speed range is greater than or equal to 120 km/h, the length range of the target light pattern is greater than or equal to 60 meters and less than or equal to 80 meters.

A second aspect of embodiments of this application provides a lighting system, including a control unit and a vehicle light module. The vehicle light module includes a light source assembly, a driving assembly, and a shielding assembly. The driving assembly is connected to the shielding assembly. The control unit is connected to the driving assembly, and the control unit is configured to obtain a driving instruction based on a driving trigger event, where the driving instruction indicates a target light pattern. The control unit is configured to send the driving instruction to the driving assembly. The light source assembly is configured to send a first beam to the shielding assembly, where the shielding assembly is located on a transmission optical path of the first beam. The driving assembly is configured to drive, according to the driving instruction, the shielding assembly to move, to change a relative position between the shielding assembly and the first beam. A second beam emitted from the shielding assembly is displayed on a path around a vehicle in the target light pattern. The shielding assembly includes at least one movable member, at least a part of the first beam is illuminated on the movable member, and a shape of a cross section of the second beam corresponds to the target light pattern.

For descriptions of beneficial effects of this aspect, refer to the first aspect. Details are not described again.

Based on the second aspect, in an optional implementation, different relative positions between the shielding assembly and the first beam correspond to different target light patterns displayed on the path for the second beam emitted by the light module, and the different target light patterns may be at least one of the following:

a form (for example, a rectangle or an arc) of the target light pattern, a length of the target light pattern, a width of the target light pattern, a bending direction of the target light pattern, bending of the target light pattern, or the like.

Based on the second aspect, in an optional implementation, the shielding assembly includes a first movable member, a second movable member, and a third movable member. The first movable member and the third movable member are located on two sides of the first beam, and the second movable member is located between the first movable member and the third movable member.

Based on the second aspect, in an optional implementation, the shielding assembly includes a first movable member, a second movable member, a third movable member, and a fourth movable member. Different relative positions between the first movable member and the third movable member and the first beam correspond to different widths of the target light pattern, and different relative positions between the second movable member and the fourth movable member correspond to different lengths of the target light pattern.

Based on the second aspect, in an optional implementation, the driving assembly is configured to drive the first movable member and the third movable member to move, and ensures that an included angle between the first movable member and the second movable member remains unchanged in a moving process, and ensures that an included angle between the third movable member and the second movable member remains unchanged.

Based on the second aspect, in an optional implementation, an overlapping area between the second movable member and a cross section of the first beam corresponds to a length of the target light pattern.

Based on the second aspect, in an optional implementation, the cross section of the second beam is trapezoidal, and the driving assembly is configured to change, by adjusting a position of the second movable member, a height of the trapezoid formed by the cross section of the second beam emitted from the shielding assembly. The height of the trapezoid is in a positive correlation with the length of the target light pattern. In other words, a higher trapezoid indicates a longer target light pattern, and a lower trapezoid indicates a shorter target light pattern.

Based on the second aspect, in an optional implementation, the driving assembly may move the first movable member and/or the third movable member left or right along a direction perpendicular to the first beam emitted by the light source assembly, and/or the driving assembly may move the first movable member and/or the third movable member forward or backward along a transmission direction of the first beam emitted by the light source assembly, to adjust a width and/or a bending direction of the target light pattern.

Based on the second aspect, in an optional implementation, the driving assembly may move the second movable member up or down along the direction perpendicular to the first beam emitted by the light source assembly, or the driving assembly may move the second movable member forward or backward along the transmission direction of the first beam emitted by the light source assembly.

Based on the second aspect, in an optional implementation, a sum of an overlapping area between the first movable member and the cross section of the first beam and an overlapping area between the third movable member and the cross section of the first beam corresponds to a width of the target light pattern.

Based on the second aspect, in an optional implementation, only the overlapping area between the first movable member and the cross section of the first beam is adjusted. In this case, the overlapping area between the first movable member and the cross section of the first beam is in a negative correlation with the width of the target light pattern. In other words, a larger overlapping area between the first movable member and the cross section of the first beam indicates a smaller width of the target light pattern, and a smaller overlapping area between the first movable member and the cross section of the first beam indicates a larger width of the target light pattern.

Based on the second aspect, in an optional implementation, only the overlapping area between the third movable member and the cross section of the first beam is adjusted. In this case, the overlapping area between the third movable member and the cross section of the first beam is in a negative correlation with the width of the target light pattern. In other words, a larger overlapping area between the third movable member and the cross section of the first beam indicates a smaller width of the target light pattern, and a smaller overlapping area between the third movable member and the cross section of the first beam indicates a larger width of the target light pattern.

Based on the second aspect, in an optional implementation, the width of the target light pattern is adjusted in a manner of simultaneously adjusting the overlapping area between the first movable member and the cross section of the first beam and the overlapping area between the third movable member and the cross section of the first beam. In this case, a sum of the overlapping area between the first movable member and the cross section of the first beam and the overlapping area between the third movable member and the cross section of the first beam is in a negative correlation with the width of the target light pattern.

Based on the second aspect, in an optional implementation, the width of the target light pattern is in a positive correlation with a distance between the first movable member and the third movable member. In other words, if the first movable member and the third movable member move towards each other so that the distance between the first movable member and the third movable member is shortened, the width of the target light pattern is smaller. Similarly, if the first movable member and the third movable member move oppositely, so that the distance between the first movable member and the third movable member becomes larger, the width of the target light pattern is larger. The width of the target light pattern is adjusted by adjusting the distance between the first movable member and the third movable member, thereby improving accuracy of the adjustment.

Based on the second aspect, in an optional implementation, a relative position between the first movable member and the third movable member corresponds to a bending direction of the target light pattern.

Based on the second aspect, in an optional implementation, the overlapping area between the second movable member and the cross section of the first beam is in a negative correlation with the length of the target light pattern.

Based on the second aspect, in an optional implementation, the target light pattern corresponds to a driving trigger event, and the driving trigger event includes at least one of the following: navigation information, driving assistance information, and head unit data.

Based on the second aspect, in an optional implementation, the target light pattern corresponds to a driving trigger event, and the driving trigger event is at least one of the following: a form of a route to be traveled along by the vehicle, a dimension of the route to be traveled along by the vehicle, a driving decision of an advanced driving assistance system (ADAS) of the vehicle, a brightness of an environment in which the vehicle is located, or a distance between the vehicle and a neighboring vehicle.

Based on the second aspect, in an optional implementation, the overlapping area between the second movable member and the cross section of the first beam is in a negative correlation with a vehicle speed.

Based on the second aspect, in an optional implementation, the sum of the overlapping area between the first movable member and the cross section of the first beam and the overlapping area between the third movable member and the cross section of the first beam is in a negative correlation with a vehicle speed.

Based on the second aspect, in an optional implementation, the target light pattern corresponds to a driving trigger event, the driving trigger event is that there is a to-be-recognized object around the vehicle, the target light pattern covers at least a target region, and the target region is a region occupied by the to-be-recognized object.

Based on the second aspect, in an optional implementation, the light module further includes a lens group. The cross section of the second beam emitted from the shielding assembly is trapezoidal. The lens group is located on a transmission optical path of the second beam emitted from the shielding assembly. The lens group is configured to display the second beam from the shielding assembly on the path in the target light pattern, and the target light pattern is rectangular.

Based on the second aspect, in an optional implementation, a distance between the light source assembly and the lens group is greater than an equivalent focal length of the lens group.

Based on the second aspect, in an optional implementation, the trapezoid has a top side and a bottom side, a length of the top side is greater than a length of the bottom side, and an included angle between the first movable member and the second movable member and an included angle between the third movable member and the second movable member are both equal to an included angle between a lateral side and the top side of the trapezoid.

Based on the second aspect, in an optional implementation, the driving assembly adjusts the included angle between the first movable member and the second movable member and the included angle between the third movable member and the second movable member, to adjust the included angle between the lateral side and the top side of the trapezoid formed by the cross section of the second beam emitted from the shielding assembly.

Based on the second aspect, in an optional implementation, the light module further includes a reflector. The cross section of the second beam emitted from the shielding assembly is rectangular. The reflector is located on the transmission optical path of the second beam emitted from the shielding assembly. The reflector is configured to display the second beam from the shielding assembly on the path in the target light pattern, and the target light pattern is rectangular.

Based on the second aspect, in an optional implementation, the light module further includes the lens group. The lens group may be located between the shielding assembly and the reflector, or the lens group is located between the lens group and a light outlet of the light module.

Based on the second aspect, in an optional implementation, a reflection surface of the reflector is an arbitrarily curved surface.

Based on the second aspect, in an optional implementation, the vehicle light module may be located in the front of the vehicle, to display the target light pattern on a path in front of the vehicle; and/or the vehicle light module may be located on a side (for example, a left side or a right side) of the vehicle, to display the target light pattern on a side of the vehicle; and/or the vehicle light module may be located at the rear of the vehicle, to display the target light pattern behind the vehicle.

Based on the second aspect, in an optional implementation, the driving instruction is obtained based on a preset list, and the preset list includes a correspondence between a vehicle speed range and a length range of the target light pattern.

Based on the second aspect, in an optional implementation, if the vehicle speed range is greater than 0 and less than 20 km/h, the length range of the target light pattern is greater than 0 and less than 10 meters. If the vehicle speed range is greater than or equal to 20 km/h and less than 40 km/h, the length range of the target light pattern is greater than or equal to 10 meters and less than 20 meters. If the vehicle speed range is greater than or equal to 40 km/h and less than 60 km/h, the length range of the target light pattern is greater than or equal to 20 meters and less than 40 meters. If the vehicle speed range is greater than or equal to 60 km/h and less than 80 km/h, the length range of the target light pattern is greater than or equal to 40 meters and less than 50 meters. If the vehicle speed range is greater than or equal to 80 km/h and less than 120 km/h, the length range of the target light pattern is greater than or equal to 50 meters and less than 60 meters. If the vehicle speed range is greater than or equal to 120 km/h, the length range of the target light pattern is greater than or equal to 60 meters and less than or equal to 80 meters.

A third aspect of embodiments of this application provides a vehicle. The vehicle includes the lighting system according to any implementation of the second aspect.

BRIEF DESCRIPTION OF DRAWINGS

FIG. 9 is a flowchart of steps of an embodiment of adjusting a target light pattern based on a vehicle speed of a vehicle according to this application;

FIG. 10 is a comparative schematic diagram of an application scenario of a lighting system according to this application;

FIG. 10a is a schematic diagram of a first application scenario of a lighting system according to this application;

FIG. 10b is a schematic diagram of a second application scenario of a lighting system according to this application;

DESCRIPTION OF EMBODIMENTS

The following describes technical solutions in embodiments of this application with reference to the accompanying drawings in embodiments of this application. The described embodiments are merely some but not all of embodiments of this application. All other embodiments obtained by a person skilled in the art based on embodiments of this application without creative efforts shall fall within the protection scope of this application.

Figure 1:
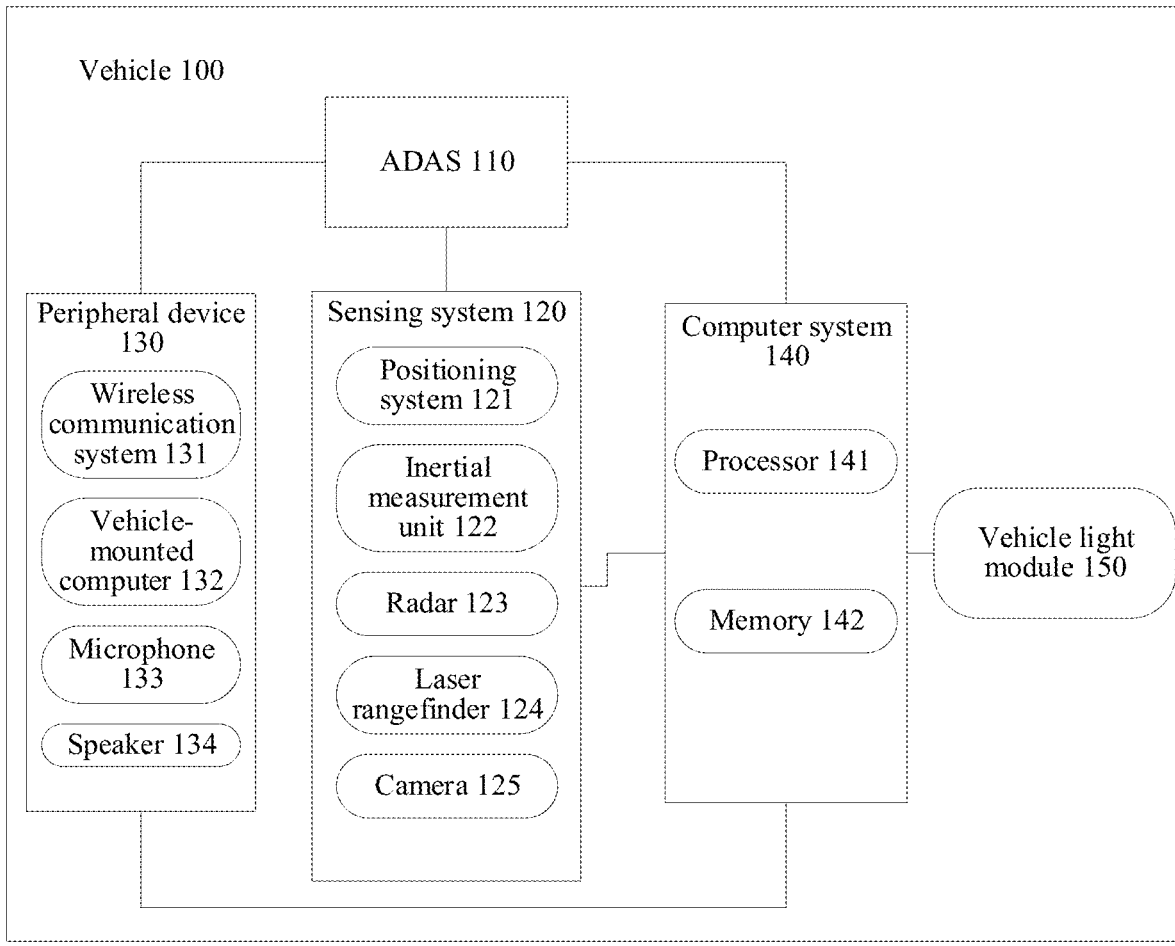
FIG. 1 is a functional block diagram of an embodiment of a vehicle according to this application.

The following first describes a vehicle to which this application is applied. FIG. 1 is a functional block diagram of an embodiment of a vehicle according to this application. In an embodiment, a vehicle 100 is configured to be in a fully or partially autonomous driving mode. For example, the vehicle 100 may control the vehicle 100 in an autonomous driving mode, and may determine current states of the vehicle and an ambient environment of the vehicle using a manual operation, determine a possible behavior of at least one another vehicle in the ambient environment, determine a confidence level corresponding to a possibility that the another vehicle performs the possible behavior, and control the vehicle 100 based on the determined information. When the vehicle 100 is in the autonomous driving mode, the vehicle 100 may be operated in a case of no man-machine interaction. The vehicle 100 may include various systems, each of which may include a plurality of elements. In addition, all the systems and elements of the vehicle 100 may be interconnected to each other wired or wirelessly.

The vehicle described in embodiments includes a sensor system 120, and the sensor system 120 may include several sensors that sense information about the ambient environment of the vehicle 100. For example, the sensor system 120 may include a positioning system 121 (the positioning system may be a global positioning system (GPS), a BeiDou system, or another positioning system), an inertial measurement unit (IMU) 122, a radar 123, a laser rangefinder 124, and a camera 125. The sensor system 120 may further include sensors (for example, an in-vehicle air quality monitor, a fuel gauge, and an oil temperature gauge) of an internal system of the monitored vehicle 100. Sensor data from one or more of these sensors can be used for detecting an object and corresponding features (a position, a shape, a direction, a speed, and the like) of the object. Such detection and recognition are key functions of a safe operation of the autonomous driving vehicle 100. The positioning system 121 may be configured to estimate a geographical location of the vehicle 100. The IMU 122 is configured to sense position and orientation changes of the vehicle 100 based on an inertial acceleration. In an embodiment, the IMU 122 may be a combination of an accelerometer and a gyroscope. The radar 123 may sense an object in the ambient environment of the vehicle 100 by using a radio signal. In some embodiments, in addition to sensing the object, the radar 123 can be further configured to sense a speed and/or a heading direction of the object. A specific type of the radar 123 is not limited in embodiments. For example, the radar 123 may be a millimeter wave radar or a lidar. The laser rangefinder 124 may sense, by using a laser, an object in an environment in which the vehicle 100 is located. In some embodiments, the laser rangefinder 124 may include one or more laser sources, a laser scanner, one or more detectors, and other system components. The camera 125 may be configured to capture a plurality of images of the ambient environment of the vehicle 100. The camera 125 may be a static camera, a video camera, a monocular/binocular camera, or an infrared imager.

The vehicle 100 further includes an advanced driving assistance system (ADAS) 110. During vehicle driving, the ADAS 110 senses the ambient environment at any time, collects data, identifies, detects, and tracks static and dynamic objects, and performs system computing and analysis based on navigation map data. In this way, a driver can be aware of any potential risk in advance, improving comfort and safety of vehicle driving. For example, the ADAS 110 may control the vehicle based on data obtained by a sensing system 120. For another example, the ADAS 110 may control the vehicle based on head unit data. The head unit data may be main data (such as fuel consumption, an engine rotational speed, and a temperature), vehicle speed information, steering wheel angle information, or vehicle body attitude data on a vehicle dashboard, or the like.

The ADAS 110 may control the vehicle in one or more of the following manners:

The ADAS 110 adjusts a heading direction of the vehicle 100. The ADAS 110 controls an operation speed of an engine of the vehicle and controls a speed of the vehicle 100. The ADAS 110 operates an image captured by the camera 125, to identify an object and/or a feature in the ambient environment of the vehicle 100. In some embodiments, the ADAS 110 may be configured to: map an environment, track an object, estimate a speed of an object, and the like. The ADAS 110 determines a traveling route of the vehicle 100. In some embodiments, the ADAS 110 may determine the traveling route for the vehicle 100 with reference to one or more pieces of predetermined map data from the sensing system 120. The ADAS 110 may identify, evaluate, and avoid or otherwise cross a potential obstacle in the environment of the vehicle 100.

The vehicle 100 interacts with an external sensor, another vehicle, another computer system, or a user via a peripheral device 130. The peripheral device 130 may include a wireless communication system 131, a vehicle-mounted computer 132, a microphone 133, and/or a speaker 134.

In some embodiments, the peripheral device 130 provides a means for a user of the vehicle 100 to interact with a user interface. For example, the vehicle-mounted computer 132 may provide information for the user of the vehicle 100. The user interface may further be used to operate the vehicle-mounted computer 132 to receive user input. The vehicle-mounted computer 132 may perform an operation by using a touchscreen. In another case, the peripheral device 130 may provide a means for the vehicle 100 to communicate with another device in the vehicle. For example, the microphone 133 may receive audio (for example, a voice command or another audio input) from the user of the vehicle 100. Similarly, the speaker 134 may output audio to the user of the vehicle 100.

The wireless communication system 131 may wirelessly communicate with one or more devices directly or over a communication network. For example, the wireless communication system 131 may use a $3^{rd}$-generation (3G) mobile communication technology for cellular communication, such as code division multiple access (CDMA), global system for mobile communications (GSM), or general packet radio service (GPRS) technology. The wireless communication system 131 may use a $4^{th}$ generation mobile communication technology (4G) for cellular communication, such as long term evolution (LTE). The wireless communication system 131 may further use a $5^{th}$ generation mobile communication technology (5G) for cellular communication. The wireless communication system 131 may use a wireless local area network (WLAN) for communication. In some embodiments, the wireless communication system 131 may directly communicate with a device over an infrared link, Bluetooth, or a ZigBee protocol. The wireless communication system 131 may alternatively use various vehicle communication systems, for example, the wireless communication system 131 may include one or more dedicated short-range communications (DSRC) devices that may include public and/or private data communication between vehicles and/or roadside stations.

Some or all functions of the vehicle 100 are controlled by a computer system 140. The computer system 140 may control the functions of the vehicle 100 based on input received from various systems (for example, the sensing system 120, the ADAS 110, and the peripheral device 130) and from the user interface. The computer system 140 may include at least one processor 141 that executes instructions stored in a non-transitory computer-readable medium such as a memory 142. The computer system 140 may alternatively be a plurality of computing devices that control individual components or subsystems of the vehicle 100 in a distributed manner.

A type of the processor 141 is not limited in embodiments. For example, the processor 141 may be one or more field-programmable gate arrays (FPGA), an application specific integrated circuit (ASIC), a system on chip (SoC), a central processing unit (CPU), a network processor (NP), a digital signal processing circuit (DSP), a microcontroller (microcontroller unit, MCU), a programmable controller (programmable logic device, PLD), or another integrated chip, or any combination of the foregoing chips or processors. The processor 141 may be located inside the vehicle, or the processor 141 may be located far away from the vehicle and perform wireless communication with the vehicle.

In some embodiments, the memory 142 may include an instruction (for example, program logic). The instruction may be executed by the processor 141 to perform various functions of the vehicle 100. In addition to the instruction, the memory 142 may further store data, such as map data, route information, and a position, a direction, a speed and other vehicle data of the vehicle. The information stored in the memory 142 may be used by the vehicle 100 and the computer system 140 during operation of the vehicle 100 in an autonomous, a semi-autonomous, and/or a manual mode.

The vehicle 100 described in embodiments further includes a vehicle light module 150. A beam emitted by the vehicle light module 150 can display a target light pattern on a path around the vehicle 100. The following describes an exemplary structure of the vehicle light module 150 with reference to each embodiment. The light module described in embodiments may not be used in a vehicle, and also be used in a driving tool such as a ship, an airplane, or a helicopter.

Figure 2:
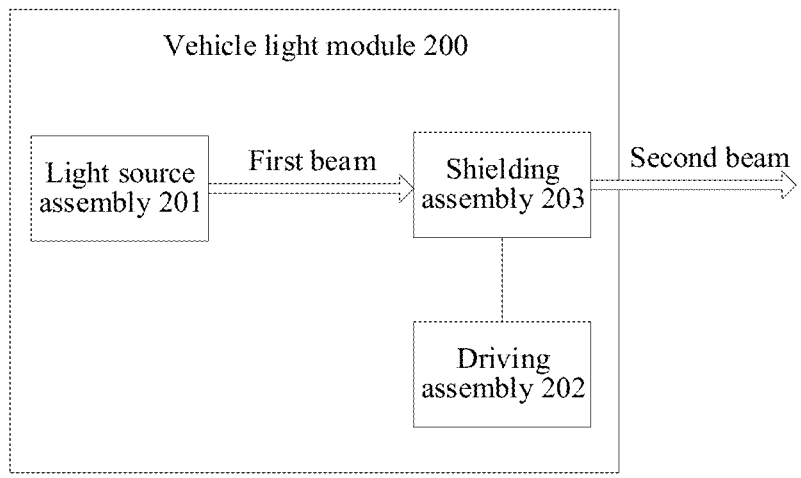
FIG. 2 is a schematic diagram of a structure of a first embodiment of a vehicle light module according to this application.

FIG. 2 is a schematic diagram of a structure of a first embodiment of a vehicle light module according to this application. A vehicle light module 200 includes a light source assembly 201, a driving assembly 202, and a shielding assembly 203.

The light source assembly 201 is configured to send a first beam to the shielding assembly 203. The light source assembly 201 described in this embodiment includes a light source. A specific type of the light source is not limited in this embodiment. For example, the light source may be a halogen lamp, a light-emitting diode (LED), a laser, an ultra-high pressure mercury lamp, or a xenon lamp. The light source assembly 201 further includes a driving unit connected to the light source, where the driving unit is configured to drive the light source to emit light. Optionally, the light source assembly 201 may further include a light homogenizing member. The light homogenizing member is located on a transmission optical path of a beam emitted by the light source. The light homogenizing member is configured to receive the beam from the light source, homogenize the beam and then send a first beam to the shielding assembly 203, to ensure that the first beam is in a state in which a light field is uniformly distributed. The light homogenizing member may be an optical device made of a fluorescent material, a light rod, a compound eyes lens, an optical waveguide, an optical fiber, a transmission module of which each peripheral surface is covered with a reflector and which is hollow; or the like. This is not specifically limited in this embodiment.

The shielding assembly 203 is located on a transmission optical path of the first beam. It can be learned that a part or all of the first beam can be illuminated on the shielding assembly 203.

The driving assembly 202 described in this embodiment is connected to the shielding assembly 203. The driving assembly 202 can drive the shielding assembly 203 to move. A specific type of the driving assembly 202 is not limited in this embodiment, provided that the driving assembly 202 can drive the shielding assembly 203 to move. For example, the driving assembly 202 may be a stepper motor, or a servo motor, or the like.

When the driving assembly 202 drives the shielding assembly 203 to move, a relative position between the shielding assembly 203 and the beam can be changed. Different relative positions between the shielding assembly 203 and the first beam can enable a second beam emitted from the shielding assembly 203 to have different light patterns.

It can be learned that, to achieve a purpose that the second beam emitted by the light module 200 can be displayed on the path around the vehicle in the target light pattern, the driving assembly 202 drives the shielding assembly 203 to move, to change a relative position between the shielding assembly 203 and the first beam, so that the second beam emitted from the shielding assembly 203 can be displayed on the path around the vehicle in the target light pattern.

It can be learned that, in this embodiment, different relative positions between the shielding assembly 203 and the first beam can be adjusted, to achieve a purpose of adjusting different target light patterns displayed on the path by the second beam emitted by the light module 200. The different target light patterns may be at least one of the following:

a form (for example, a rectangle or an arc) of the target light pattern, a length of the target light pattern, a width of the target light pattern, a bending direction of the target light pattern, bending of the target light pattern, or the like.

The following describes several optional structures of the shielding assembly 203.

Optional Structure 1

Figure 3:
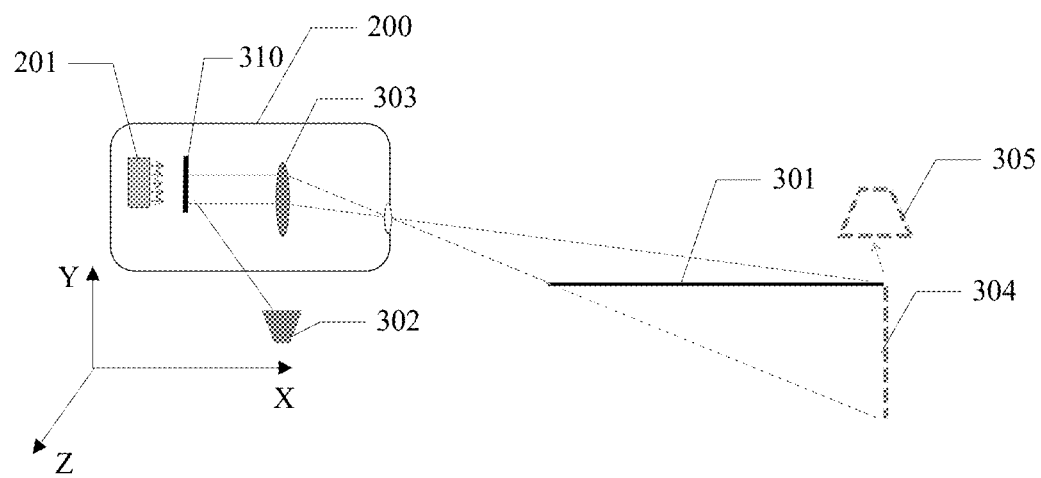
FIG. 3 is a schematic diagram of a structure of a second embodiment of a light module according to this application.

For this structure, refer to FIG. 3. FIG. 3 is a schematic diagram of a structure of a second embodiment of a light module according to this application. A light source assembly 201 sends a first beam to a shielding assembly 310, and the shielding assembly 310 is configured to adjust a shape of a cross section of the first beam. It may be understood that the cross section of the first beam is a cross section along a direction perpendicular to a transmission direction of the first beam. The transmission direction of the first beam is an X direction shown in FIG. 3, and the direction perpendicular to the transmission direction of the first beam is a Y direction shown in FIG. 3.

The shielding assembly 310 changes, by changing a relative position between the shielding assembly 310 and the first beam, a shape of a cross section of a second beam emitted from the shielding assembly 310. For descriptions of the cross section of the second beam, refer to the foregoing descriptions of the cross section of the first beam. Details are not described again.

In this embodiment, the shape of the cross section of the second beam emitted from the shielding assembly 310 is related to the target light pattern formed on the path by the second beam emitted by the vehicle light module. In this example, the target light pattern is rectangular, and the cross section of the second beam is trapezoidal.

Therefore, for the shape of the cross section of the second beam emitted from the shielding assembly 310 in this example, refer to a trapezoid 302 shown in FIG. 3. Specifically, the second beam is transmitted in a direction perpendicular to a plane YZ. The plane YZ is a plane including the Y direction and a Z direction, and the Z direction is perpendicular to both the X direction and the Y direction shown above. It can be learned that the cross section of the second beam is a cross section along the plane YZ. In the plane YZ, the cross section of the second beam is trapezoidal. In addition, to ensure that the second beam is displayed as a rectangular target light pattern on a path 301, in the plane YZ, the trapezoid 302 includes a top side and a bottom side. In the plane YZ, the top side is located above the bottom side, and a length of the top side is greater than a length of the bottom side. The trapezoid 302 shown in this structure may be an isosceles trapezoid.

A specific form of the cross section of the first beam is not limited in this embodiment. For example, the cross section of the first beam emitted by the light source assembly 201 may be trapezoidal or rectangular. In this embodiment, by using the shielding assembly 310, the cross section of the first beam is changed to the trapezoid 302 formed by the cross section of the second beam.

A lens group 303 is further included in the transmission optical path of the second beam. The lens group 303 described in this embodiment includes one or more lenses. A quantity of lenses included in the lens group 303 is not limited in this embodiment. A distance between the light source assembly 201 and the lens group 303 described in this embodiment is greater than an equivalent focal length of the lens group 303, to ensure that after a beam emitted by the light source assembly 201 passes through the lens group 303, an inverted and enlarged real image is formed. Specifically, because the shielding assembly 310 is located between the light source assembly 201 and the lens group 303, the lens group 303 can receive the second beam that is from the shielding assembly 310 and of which the cross section is trapezoidal, and the second beam passing through the lens group 303 can be a trapezoid 305 at an imaging position 304. In addition, in the plane YZ, the trapezoid 305 is formed by enlarging and inverting the trapezoid 302.

The path described in this embodiment is located between the lens group 303 and the imaging position 304, and the path 301 is located on the transmission optical path of the second beam emitted from the lens group 303. It can be learned that due to block of the path 301, the second beam forms a real image on the path 301. In addition, lengths projected by the top side of the trapezoid 302 and the bottom side of the trapezoid 302 on the path 301 are equal. It can be learned that the trapezoid 302 is projected on the path 301 to display a rectangle.

The vehicle light module described in this embodiment can adjust a length and/or a width of the rectangle displayed on the path 301. In this embodiment, a dimension of the cross section of the second beam emitted from the shielding assembly 310 may be adjusted, to achieve a purpose of adjusting the length and/or the width of the rectangle displayed on the path 301. Therefore, the following describes a process of adjusting the cross section of the second beam by the shielding assembly 310.

Figure 4A:
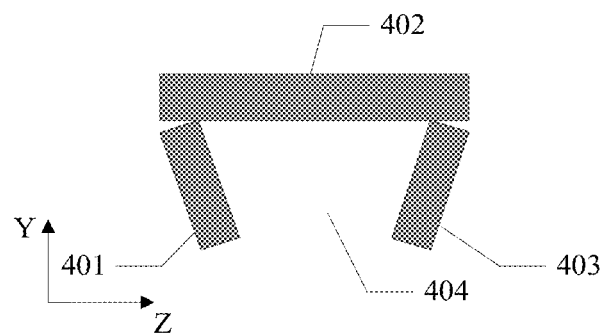
FIG. 4a is a schematic diagram of a structure of a first embodiment of a shielding assembly according to this application.
Figure 4B:
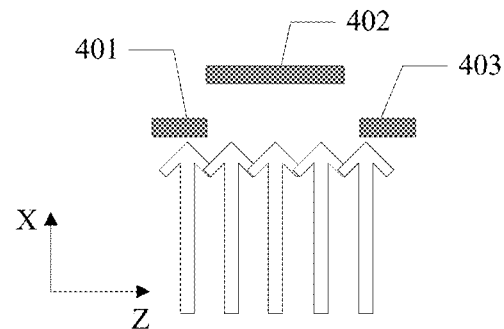
FIG. 4b is a schematic diagram of a structure of a second embodiment of a shielding assembly according to this application.

For an exemplary structure of the shielding assembly 310 described in this example, refer to FIG. 4a and FIG. 4b. FIG. 4a is a schematic diagram of a structure of the shielding assembly 310 from the perspective of the plane YZ. FIG. 4b is a schematic diagram of a structure of the shielding assembly 310 from the perspective of a plane XZ.

The shielding assembly 310 includes a first movable member 401, a second movable member 402, and a third movable member 403, and the first movable member 401, the second movable member 402, and the third movable member 403 are all connected to the driving assembly 202, to ensure that the driving assembly 202 can drive the first movable member 401, the second movable member 402, and the third movable member 403 to move. In this embodiment, the second movable member 402 is located between the first movable member 401 and the third movable member 403. The first movable member 401 and the third movable member 403 are located on two sides of the first beam. The first movable member 401, the second movable member 402, and the third movable member 403 in this embodiment are all movable members illuminated by the first beam.

The driving assembly 202 described in this embodiment adjusts an included angle between the first movable member 401 and the second movable member 402 and an included angle between the third movable member 403 and the second movable member 402, to adjust an included angle between a lateral side and the top side of the trapezoid 302 formed by the cross section of the second beam, to ensure that the target light pattern displayed on the path of the second beam is of a rectangular structure.

In addition, in a process in which the driving assembly 202 passes through the shielding assembly 310, the first beam can only pass through a light-transmitting region 404, and the second beam passing through the light-transmitting region 404 is used to form the target light pattern. To ensure that the cross section of the second beam is trapezoidal, the shape of the light-transmitting region 404 described in this embodiment is the same trapezoid as the cross section of the second beam. In this embodiment, a specific shape of a cross section of each movable member in the plane YZ is not limited, provided that the light-transmitting region 404 is a region together defined by the first movable member 401, the second movable member 402, and the third movable member 403 in the plane YZ, to ensure that the first beam can only pass through the light-transmitting region 404 to form the second beam.

In the plane YZ, the included angle between the first movable member 401 and the second movable member 402 and the included angle between the third movable member 403 and the second movable member 402 are both equal to the included angle between the lateral side and the top side of the trapezoid 302. It can be learned that the shielding assembly 310 using this structure can ensure that the cross section of the emitted second beam has a structure of the trapezoid 302.

To ensure stability of the structure of the target light pattern presented by the second beam on the path, the first movable member 401 may move left or right along a Z direction, and in a process in which the first movable member 401 moves, the included angle between the first movable member 401 and the second movable member 402 remains unchanged. Similarly, along the Z direction, the third movable member 403 may move left or right, and in a process in which the third movable member 403 moves, the included angle between the third movable member 403 and the second movable member 402 remains unchanged, to ensure that the target light pattern can always be in a rectangular structure in a vehicle driving process.

The driving assembly 202 described in this embodiment can further adjust a length of the target light pattern by adjusting an overlapping area between the second movable member 402 and the cross section of the first beam. Therefore, the driving assembly 202 may adjust, along the Y direction, the second movable member 402 to move up or down, to change a height of the trapezoid 302 formed by the cross section of the second beam. The height of the trapezoid 302 is in a positive correlation with the length of the target light pattern, and the length of the target light pattern is a length of the target light pattern along an extension direction of a path. It can be learned that, a higher trapezoid 302 indicates a longer target light pattern, and a lower trapezoid 302 indicates a shorter target light pattern.

Specifically, in a process in which the second movable member 402 moves up or down, the overlapping area between the second movable member 402 and the cross section of the first beam is changed, to change the height of the trapezoid 302. Specifically, a larger overlapping area indicates more light blocked by the second movable member 402 in the Y direction and indicates a lower trapezoid 302 formed by the cross section of the second beam emitted from the shielding assembly 310. Similarly, a smaller overlapping area indicates less light blocked by the second movable member 402 in the Y direction and indicates a higher trapezoid 302 formed by the cross section of the second beam emitted from the shielding assembly 310.

For example, a distance at which the second movable member 402 moves upwards along the Y direction is in a positive correlation with a height of the light-transmitting region 404 along the Y direction. The height of the light-transmitting region 404 along the Y direction is in a positive correlation with the height of the trapezoid 302 formed by the cross section of the second beam. It can be learned that, when the second movable member 402 moves upwards along the Y direction, less light is blocked by the second movable member 402, the height of the light-transmitting region 404 along the Y direction is larger, and a height of the trapezoid 302 formed by the cross section of the second beam emitted from the light-transmitting region 404 is larger. Similarly, when the second movable member 402 moves downwards along the Y direction, more light is blocked by the second movable member 402, the height of the light-transmitting region 404 along the Y direction is smaller, and the height of the trapezoid 302 formed by the cross section of the second beam emitted from the light-transmitting region 404 is smaller.

With reference to FIG. 4a and FIG. 4b, as shown in FIG. 4b, an example in which the first movable member 401 and the third movable member 403 are located in front of the second movable member 402 along the X direction is used. In this example, the second movable member 402 is adjusted to move up or down to adjust the height of the trapezoid 302, and this is not limited. In another example, the height of the trapezoid 302 may be alternatively adjusted by adjusting the second movable member 402 to move forward or backward along the X direction. When the first beam emitted by the light source assembly 201 has a specific divergence angle, a length of the target light pattern may be adjusted by adjusting the second movable member 402 to move along the X direction. For example, along the X direction, a distance between the second movable member 402 and the first movable member 401 (or the third movable member 403) is in a negative correlation with the height of the trapezoid 302 formed by the cross section of the second beam. It can be learned that, when the second movable member 402 moves along the X direction to a position farther from the first movable member 401 (for example, as shown in FIG. 4*b*, the second movable member 402 moves upwards in the plane XZ), less light is blocked by the second movable member 402, and the height of the light-transmitting region 404 along the Y direction is larger. Similarly, when the second movable member 402 moves along the X direction to a position closer to the first movable member 401 (for example, as shown in FIG. 4*b*, the second movable member 402 moves downwards in the plane XZ), more light is blocked by the second movable member 402, and the height of the light-transmitting region 404 along the Y direction is smaller.

Figure 4C:
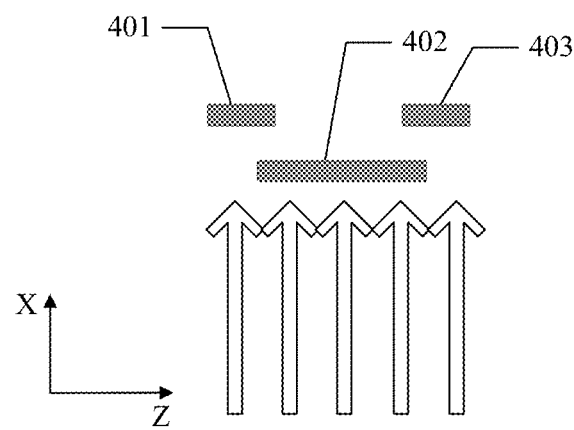
FIG. 4c is a schematic diagram of a structure of a third embodiment of a shielding assembly according to this application.

With reference to FIG. 4*a* to FIG. 4*c*, as shown in FIG. 4*c*, an example in which the first movable member 401 and the third movable member 403 are located behind the second movable member 402 along the X direction is used. In this example, the second movable member 402 is adjusted to move up or down to adjust the height of the trapezoid 302, and this is not limited. In another example, the height of the trapezoid 302 may be alternatively adjusted by adjusting the second movable member 402 to move forward or backward along the X direction. When the first beam emitted by the light source assembly 201 has a specific divergence angle, a length of the target light pattern may be adjusted by adjusting the second movable member 402 to move along the X direction. For example, along the X direction, a distance between the second movable member 402 and the light source assembly is in a negative correlation with the height of the trapezoid 302 formed by the cross section of the second beam. It can be learned that, when the second movable member 402 moves along the X direction to a position farther from the light source assembly (for example, as shown in FIG. 4*b*, the second movable member 402 moves upwards in the plane XZ), less light is blocked by the second movable member 402, and the height of the light-transmitting region 404 along the Y direction is larger. Similarly, when the second movable member 402 moves along the X direction to a position closer to the light source assembly (for example, as shown in FIG. 4*b*, the second movable member 402 moves downwards in the plane XZ), more light is blocked by the second movable member 402, and the height of the light-transmitting region 404 along the Y direction is smaller.

In this embodiment, an example in which the second movable member 402 is located above the first movable member 401 and the third movable member 403 is used. In another example, the second movable member 402 may be alternatively located below the first movable member 401 and the third movable member 403. For descriptions of a manner of adjusting the length of the target light pattern by the second movable member 402 located below the first movable member 401 and the third movable member 403, refer to descriptions of a manner of adjusting the length of the target light pattern by the second movable member 402 located above the first movable member 401 and the third movable member 403. Details are not described again.

In this embodiment, descriptions of a quantity of movable members included in the shielding assembly 203 is an optional example, and this is not limited. In another example, in the plane YZ, the shielding assembly may further include a fourth movable member, the first movable member and the fourth movable member are located on top and bottom sides of the first beam, and the second movable member and the third movable member are located on left and right sides of the first beam. In this example, the length of the target light pattern may be adjusted by adjusting a distance between the first movable member and the fourth movable member. In other words, the distance between the first movable member and the fourth movable member is in a positive correlation with the length of the target light pattern. In other words, a larger distance between the first movable member and the fourth movable member indicates less light blocked between the first movable member and the fourth movable member, and a longer target light pattern. Similarly, a smaller distance between the first movable member and the fourth movable member indicates more light blocked between the first movable member and the fourth movable member, and a shorter target light pattern. The first movable member, the second movable member, the third movable member, and the fourth movable member in this embodiment are all movable members illuminated by the first beam.

The driving assembly 202 described in this embodiment can further adjust a width of the target light pattern. For this purpose, along a Z direction, the driving assembly 202 may adjust an overlapping area between the first movable member and the cross section of the first beam, and/or adjust an overlapping area between the third movable member and the cross section of the first beam. For example, a distance between the first movable member 401 and the third movable member 403 may be adjusted, to change the width of the target light pattern presented by the second beam on the path.

Specifically, when the first beam is illuminated on both the first movable member 401 and the third movable member 403, the width of the target light pattern is in a positive correlation with the distance between the first movable member 401 and the third movable member 403. In other words, the first movable member 401 and the third movable member 403 move towards each other along the Z direction, so that the distance between the first movable member 401 and the third movable member 403 along the Z direction is shortened. In other words, it indicates more light blocked by the first movable member 401 and the third movable member 403 in the Z direction and indicates a smaller width of the target light pattern. Similarly, the first movable member 401 and the third movable member 403 move oppositely along the Z direction, so that the distance between the first movable member 401 and the third movable member 403 along the Z direction becomes larger. In other words, it indicates less light blocked by the first movable member 401 and the third movable member 403 in the Z direction and indicates a larger width of the target light pattern.

This embodiment is described by using an example in which the first movable member 401 and the third movable member 403 are moved simultaneously. In another example, only the first movable member 401 or the third movable member 403 may be moved, to adjust the width of the target light pattern. In other words, along the Z direction, a larger width of the light-transmitting region indicates a larger width of the target light pattern, and a smaller width of the light-transmitting region indicates a smaller width of the target light pattern.

It can be learned that, in this embodiment, the first movable member 401, the second movable member 402, and the third movable member 403 may be moved, to adjust the length and/or the width of the target light pattern.

Optional Structure 2

Figure 5:
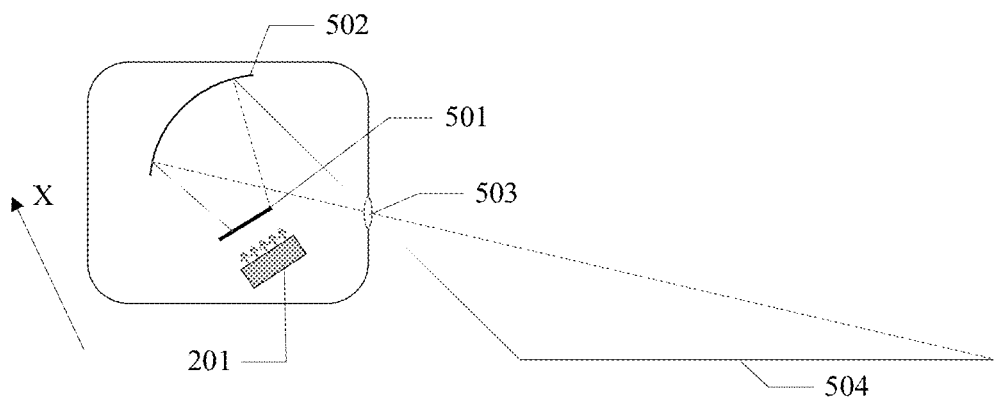
FIG. 5 is a schematic diagram of a structure of a third embodiment of a light module according to this application.

For this structure, refer to FIG. 5. FIG. 5 is a schematic diagram of a structure of a third embodiment of a light module according to this application. The light source assembly 201 sends the first beam to a shielding assembly 501, and the shielding assembly 501 is configured to adjust a shape of a light-emitting surface of the first beam. It may be understood that the light-emitting surface of the first beam is a cross section of the first beam along a direction perpendicular to a transmission direction of the first beam. The transmission direction of the first beam is an X direction, and the direction perpendicular to the transmission direction of the first beam is a Y direction shown in FIG. 5.

The shielding assembly 501 changes, by changing a relative position between the shielding assembly 501 and the first beam, a shape of a cross section of the second beam emitted from the shielding assembly 501. For descriptions of the cross section of the second beam, refer to the foregoing descriptions of the cross section of the first beam. Details are not described again.

In this embodiment, the shape of the cross section of the second beam emitted from the shielding assembly 501 is related to the target light pattern formed on the path by the second beam emitted by the vehicle light module. In this example, the target light pattern is rectangular, and the cross section of the second beam is also rectangular.

A specific form of the cross section of the first beam is not limited in this embodiment. For example, the cross section of the first beam emitted by the light source assembly 201 may be any shape such as trapezoidal, rectangular, or circular. In this embodiment, the shielding assembly 501 changes the cross section of the first beam to a rectangular cross section of the second beam.

A reflector 502 is further included in a transmission optical path of the second beam. The reflector 502 described in this embodiment is configured to deflect a transmission direction of the second beam from the shielding assembly 501 to a light outlet 503 of the vehicle light module, to ensure that the second beam emitted from the light outlet 503 can be displayed in a target light pattern 504 on a path. A specific type of the reflector 502 is not limited in this embodiment, provided that the reflector 502 can project, through the light outlet 503, the second beam from the shielding assembly 501 onto the path to display the second beam in the target light pattern. A specific form of a reflection surface of the reflector 502 is not limited in this embodiment. For example, the reflection surface of the reflector 502 may be an arbitrarily curved surface, a flat surface, a spherical surface, or an aspheric surface.

Optionally, the light module described in this example further includes a lens group. The lens group may be located between the shielding assembly 501 and the reflector 502, or the lens group is located between the lens group and the light outlet 503. The lens group is configured to ensure that after a beam emitted by the light source assembly 201 passes through the lens group, an enlarged real image is formed on a path. For exemplary descriptions of the lens group, refer to the foregoing optional structure 1. Details are not described again.

The reflector 502 described in this embodiment is located on the transmission optical path of the second beam emitted from the shielding assembly 501, and a cross section of the second beam is rectangular. In this embodiment, a form of the target light pattern may be ensured by setting a curvature of the reflector 502. In this embodiment, an example in which the form of the target light pattern is rectangular is used for description. In another example, the form of the target light pattern may also be changed by changing the curvature of the reflector 502. For example, the shape of the target light pattern may be changed to any shape such as an arc or a circle.

The vehicle light module described in this embodiment can adjust a length and/or a width of the rectangle displayed on the path. In this embodiment, a dimension of the cross section of the second beam emitted from the shielding assembly 501 may be adjusted, to achieve a purpose of adjusting the length and/or the width of the rectangle displayed on the path. Therefore, the following describes a process of adjusting the cross section of the second beam by the shielding assembly 501.

Figure 6:
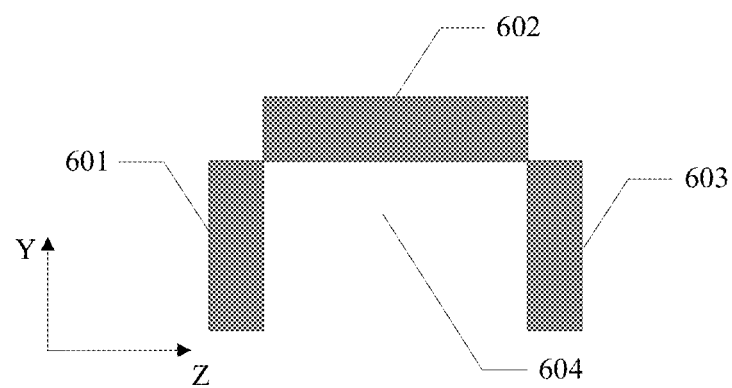
FIG. 6 is a schematic diagram of a structure of a fourth embodiment of a shielding assembly according to this application.

For an exemplary structure of the shielding assembly 501 described in this example, refer to FIG. 6. FIG. 6 is a schematic diagram of a structure of the shielding assembly 501 from the perspective of a plane YZ. The plane YZ is a plane perpendicular to a X direction.

The shielding assembly 501 includes a first movable member 601, a second movable member 602, and a third movable member 603. The first movable member 601, the second movable member 602, and the third movable member 603 are all connected to the driving assembly 202, to ensure that the driving assembly 202 can drive the first movable member 601, the second movable member 602, and the third movable member 603 to move. The second movable member 602 described in this embodiment is located between the first movable member 601 and the third movable member 603. The first movable member 601 and the third movable member 603 are located on two sides of the first beam. In addition, to implement a rectangular structure of the target light pattern, the first movable member 601 and the third movable member 603 are both perpendicular to the second movable member 602.

In addition, in a process in which the driving assembly 202 passes through the shielding assembly 501, the first beam can only pass through a light-transmitting region 604, and the second beam passing through the light-transmitting region 604 is used to form the target light pattern. To ensure that the cross section of the second beam is rectangular, the shape of the light-transmitting region 604 described in this embodiment is the same rectangle as the cross section of the second beam. In this embodiment, a specific shape of a cross section of each movable member in the plane YZ is not limited, provided that the light-transmitting region 604 is a region together defined by the first movable member 601, the second movable member 602, and the third movable member 603 in the plane YZ, to ensure that the first beam can only pass through the light-transmitting region 604 to form the second beam.

The driving assembly 202 described in this embodiment can further adjust a length of the target light pattern by adjusting an overlapping area between the second movable member 602 and the cross section of the first beam. Therefore, the driving assembly 202 may adjust, along the Y direction, the second movable member 602 to move up or down, to change a length of the rectangle formed by the cross section of the second beam. The length of the rectangle is in a positive correlation with the length of the target light pattern, and the length of the target light pattern is a length of the target light pattern along an extension direction of a path. It can be learned that, a longer rectangle indicates a longer target light pattern, and a shorter rectangle indicates a shorter target light pattern.

Specifically, in a process in which the second movable member 602 moves up or down, the overlapping area between the second movable member 602 and the cross section of the first beam is changed, to change the length of the rectangle. Specifically, a larger overlapping area indicates more light blocked by the second movable member 602 in the Y direction and further indicates a longer rectangle formed by the cross section of the second beam emitted from the shielding assembly. Similarly, a smaller overlapping area indicates less light blocked by the second movable member 602 in the Y direction and indicates a longer rectangle formed by the cross section of the second beam emitted from the shielding assembly.

For example, a distance at which the second movable member 602 moves upwards along the Y direction is in a positive correlation with a height of the light-transmitting region 604 along the Y direction. The height of the light-transmitting region 604 along the Y direction is in a positive correlation with the length of the rectangle formed by the cross section of the second beam. It can be learned that, when the second movable member 602 moves upwards along the Y direction, less light is blocked by the second movable member 602, the height of the light-transmitting region 604 along the Y direction is larger, and the length of the rectangle formed by the cross section of the second beam emitted from the light-transmitting region 604 is larger. Similarly, when the second movable member 602 moves downwards along the Y direction, more light is blocked by the second movable member 602, the height of the light-transmitting region 604 along the Y direction is smaller, and the length of the rectangle formed by the cross section of the second beam emitted from the light-transmitting region 604 is smaller.

In this example, a manner of adjusting the second movable member 602 to move up or down is used to adjust the length of the rectangle, and this is not limited. In another example, the length of the rectangle may also be adjusted in a manner of adjusting the second movable member 602 to move forward or backward along the X direction. When the first beam emitted by the light source assembly 201 has a specific divergence angle, a length of the target light pattern may be adjusted by adjusting the second movable member 602 to move along the X direction. For example, along the X direction, a distance between the second movable member 602 and the first movable member 601 (or the third movable member 603) is in a negative correlation with the length of the rectangle formed by the cross section of the second beam. It can be learned that, when the second movable member 602 moves along the X direction to a position farther from the first movable member 601, less light is blocked by the second movable member 602, and the height of the light-transmitting region 604 along the Y direction is larger. Similarly, when the second movable member 602 moves along the X direction to a position closer to the first movable member 601, more light is blocked by the second movable member 602, and the height of the light-transmitting region 604 along the Y direction is smaller.

In this embodiment, an example in which the second movable member 602 is located above the first movable member 601 and the third movable member 603 is used. In another example, the second movable member 602 may be alternatively located below the first movable member 601 and the third movable member 603. For descriptions of a manner of adjusting the length of the target light pattern by the second movable member 602 located below the first movable member 601 and the third movable member 603, refer to descriptions of a manner of adjusting the length of the target light pattern by the second movable member 602 located above the first movable member 601 and the third movable member 603. Details are not described again.

In this embodiment, descriptions of a quantity of movable members included in the shielding assembly is an optional example, and this is not limited. In another example, in the plane YZ, the shielding assembly may further include a fourth movable member, the first movable member and the fourth movable member are located on top and bottom sides of the first beam, and the second movable member and the third movable member are located on left and right sides of the first beam. In this example, the length of the target light pattern may be adjusted by adjusting a distance between the first movable member and the fourth movable member. In other words, the distance between the first movable member and the fourth movable member is in a positive correlation with the length of the target light pattern. In other words, a larger distance between the first movable member and the fourth movable member indicates less light blocked between the first movable member and the fourth movable member, and a longer target light pattern. Similarly, a smaller distance between the first movable member and the fourth movable member indicates more light blocked between the first movable member and the fourth movable member, and a shorter target light pattern.

The driving assembly 202 described in this embodiment can further adjust a width of the target light pattern. For this purpose, along a Z direction, the driving assembly 202 may adjust an overlapping area between the first movable member and the cross section of the first beam, and/or adjust an overlapping area between the third movable member and the cross section of the first beam. For example, a distance between the first movable member 601 and the third movable member 603 may be adjusted, to change the width of the target light pattern presented by the second beam on the path.

Specifically, when the first beam is illuminated on both the first movable member 601 and the third movable member 603, the width of the target light pattern is in a positive correlation with the distance between the first movable member 601 and the third movable member 603. In other words, the first movable member 601 and the third movable member 603 move towards each other along the Z direction, so that the distance between the first movable member 601 and the third movable member 603 along the Z direction is shortened. In other words, it indicates more light blocked by the first movable member 601 and the third movable member 603 in the Z direction and indicates a smaller width of the target light pattern. Similarly, the first movable member 601 and the third movable member 603 move oppositely along the Z direction, so that the distance between the first movable member 601 and the third movable member 603 along the Z direction becomes larger. In other words, it indicates less light blocked by the first movable member 601 and the third movable member 603 in the Z direction and indicates a larger width of the target light pattern.

This embodiment is described by using an example in which the first movable member 601 and the third movable member 603 are moved simultaneously. In another example, only the first movable member 601 or the third movable member 603 may be moved, to adjust the width of the target light pattern. In other words, along the Z direction, a larger width of the light-transmitting region indicates a larger width of the target light pattern, and a smaller width of the light-transmitting region indicates a smaller width of the target light pattern.

It can be learned that, in this embodiment, the first movable member 601, the second movable member 602, and the third movable member 603 may be moved, to adjust the length and/or the width of the target light pattern.

For descriptions of relative positions of the first movable member 601, the second movable member 602, and the third movable member 603 in the XZ plane in this embodiment, refer to the foregoing optional structure 1. Details are not described again.

Optional Structure 3

In the optional structure 1 and the optional structure 2, an example in which the target light pattern displayed on the path is rectangular is used for description. In this optional structure, the target light pattern in this optional structure is of an arc-shaped structure.

For example, for the structure of the light module in a plane XY, refer to FIG. 3 or FIG. 5. In this example, an example in which the structure of the light module in the plane XY is shown in FIG. 3 is used for description. For a structure of the shielding assembly 310 in this example in the plane YZ, refer to FIG. 7a. In other words, as described in this example, a length of the target light pattern can be adjusted through a position of a second movable member 702, and a width of the target light pattern can be adjusted through positions of a first movable member 701 and a third movable member 703. For exemplary descriptions, refer to the foregoing optional structure 1. Details are not described again. A manner of adjusting a bending direction of the target light pattern in this structure may be as follows:

A light-transmitting region 704 defined by the first movable member 701, the second movable member 702, and the third movable member 703 in this embodiment is of a quadrilateral structure, to ensure that the second beam emitted from the light-transmitting region 704 can form an arc-shaped target light pattern on a path.

Figure 7A:
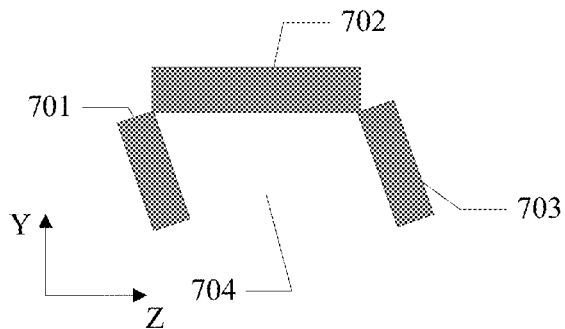
FIG. 7a is a schematic diagram of a structure of a fifth embodiment of a shielding assembly according to this application.
Figure 7B:
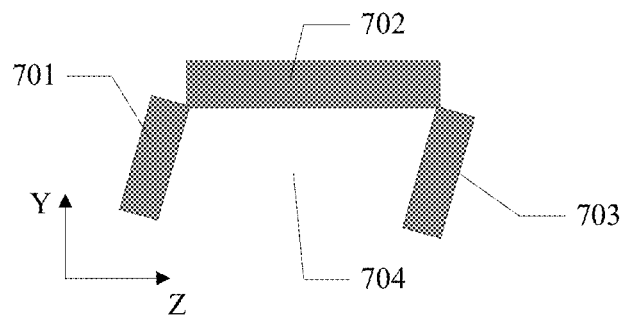
FIG. 7b is a schematic diagram of a structure of a sixth embodiment of a shielding assembly according to this application.

As shown in FIG. 7a, in the plane YZ, an included angle between the first movable member 701 and the second movable member 702 is an acute-angle structure. In this example, a target light pattern is bent along a first bending direction. As shown in FIG. 7b, in the plane YZ, an included angle between the first movable member 701 and the second movable member 702 is an obtuse-angle structure. In this example, a target light pattern is bent along a second bending direction. The first bending direction is opposite to the second bending direction.

In this embodiment, an angle between the first movable member 701 and the second movable member 702 in the plane YZ may be adjusted to adjust bending of the target light pattern. For example, in the example shown in FIG. 7a, in the example of bending along the first bending direction, the smaller the angle between the first movable member 701 and the second movable member 702 is, the more the target light pattern bends. In the example of bending along the first bending direction, the larger the angle between the first movable member 701 and the second movable member 702 is, the less the target light pattern bends. For another example, in the example shown in FIG. 7b, in the example of bending along the second bending direction, the smaller the angle between the first movable member 701 and the second movable member 702 is, the less the target light pattern bends. In the example of bending along the second bending direction, the larger the angle between the first movable member 701 and the second movable member 702 is, the more the target light pattern bends.

In the plane YZ in this structure, the shielding assembly may further include a fourth movable member, the first movable member and the fourth movable member are located on top and bottom sides of the first beam, the second movable member and the third movable member are located on left and right sides of the first beam, and a light-transmitting region defined by the first movable member, the second movable member, the third movable member, and the fourth movable member is of a quadrilateral structure.

It should be noted that the description of the structure of the shielding assembly in this embodiment may be an optional example, and this is not limited, provided that the shielding assembly can adjust a shape of the cross section of the second beam emitted from the shielding assembly. For example, in another example, the shielding assembly may only include the foregoing second movable member, to adjust a length of the target light pattern. For another example, the shielding assembly may only include the foregoing first movable member and the third movable member, to adjust a width of the target light pattern.

Figure 8:
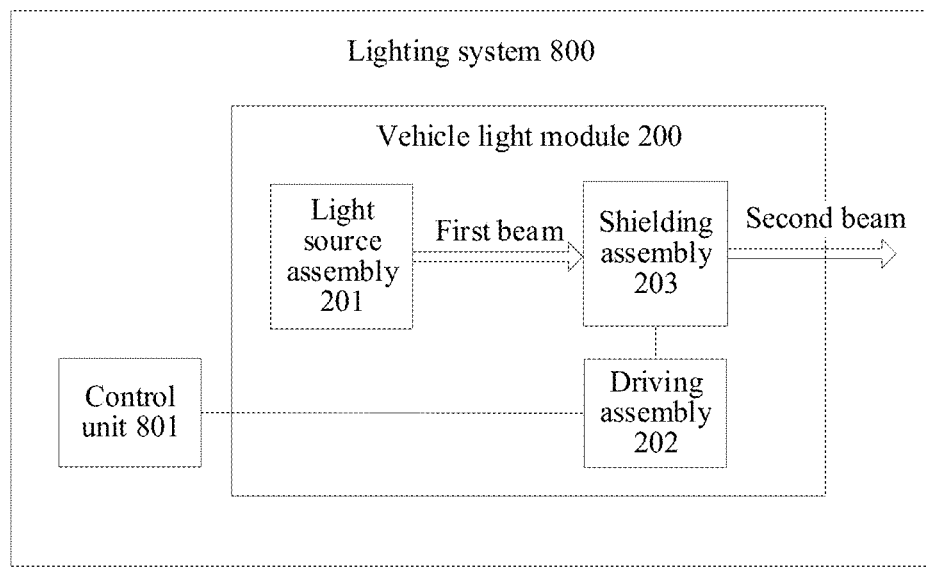
FIG. 8 is a schematic diagram of a structure of an embodiment of a lighting system according to this application.

This application provides a lighting system. As shown in FIG. 8, a lighting system 800 includes a control unit 801 and the foregoing vehicle light module 200. The control unit 801 is connected to the driving assembly 202, and the control unit 801 is configured to send a driving instruction to the driving assembly 202, where the driving instruction indicates a target light pattern. The driving assembly 202 is configured to drive, according to the driving instruction, the shielding assembly 203 to move, to ensure that a second beam emitted from the shielding assembly 203 can be displayed on a path in the target light pattern. Specifically, the control unit 801 described in this embodiment is configured to obtain the driving instruction based on at least one of the following: navigation information, driving assistance information, and head unit data. In this embodiment, an example in which the control unit 801 is located in the computer system 140 shown in FIG. 1 is used for description. It can be learned that the control unit 801 described in this embodiment may be one or more processors included in the computer system 140. In another example, the control unit 801 may be located inside the vehicle light module 200. This is not specifically limited in this embodiment.

This embodiment is described by using an example in which the driving assembly 202 adjusts the target light pattern according to the driving instruction from the control unit 801. In another example, a driver may directly input the driving instruction to the driving assembly, and the driver may dynamically adjust the target light pattern according to an actual situation.

Based on the lighting system provided in this application, the following describes a process of adjusting the target light pattern by the lighting system described in this application. In this example, the target light pattern may be adjusted based on a vehicle speed. For exemplary descriptions, refer to FIG. 9.

Step 901: The control unit determines to start the lighting system.

In this embodiment, the driver may input a turn-on instruction to start the lighting system. For example, the control unit receives the turn-on instruction input by the driver in a manner such as a voice input to the lighting system, a touch gesture input to a vehicle cockpit screen, or a pressing operation.

For another example, the control unit may determine, when determining that the vehicle meets a trigger condition, to start the lighting system. The trigger condition may be at least one of the following:

The current speed of the vehicle is greater than or equal to a first preset value (for example, the first preset value may be 60 km/h), a brightness of an environment in which the vehicle is currently located is less than or equal to a second preset value (for example, the second preset value may be 50 lux), or a form of a route to be traveled along by the vehicle changes, or variation of the vehicle speed of the vehicle is greater than or equal to a preset value.

The form change of the route to be traveled along by the vehicle may be: The route to be traveled along by the vehicle of the vehicle indicates switching of the vehicle from a straight-going direction to a turning state, or the route to be traveled along by the vehicle of the vehicle indicates switching from a turning state to a straight-going state, or the route to be traveled along by the vehicle of the vehicle indicates that the vehicle is to travel to an intersection, or the route to be traveled along by the vehicle of the vehicle indicates that a dimension of a lane line changes (for example, a width of a lane line changes).

A vehicle speed of the vehicle obtained by the vehicle at a moment T1 is V1, and a vehicle speed obtained by the vehicle at a moment T2 is V2, where the moment T1 is a current moment, the moment T2 is earlier than the moment T1. That the variation of the vehicle speed of the vehicle is greater than or equal to a preset value may be: A difference between V2 and V1 is greater than or equal to the preset value. For example, the preset value may be 10 km/h. It can be learned that when the variation of the vehicle speed of the vehicle is greater than or equal to 10 km/h, the lighting system is started.

Step 902: The control unit obtains the driving instruction based on the vehicle speed.

The driving instruction indicates the target light pattern. The driving assembly may move the shielding assembly based on the driving instruction, to ensure that a target light pattern displayed on a path by a beam emitted from the shielding assembly corresponds to a vehicle speed.

The control unit in this example may determine the driving instruction based on the following two optional manners:

Manner 1:

In this manner, the control unit may obtain a correspondence list between vehicle speeds and target light patterns shown in the following Table 1.

TABLE 1

| Vehicle speed | Length of target light pattern |
| --- | --- |
| Greater than 120 km/h | 60 m to 80 m |
| 120 km/h to 80 km/h | 50 m to 60 m |
| 80 km/h to 60 km/h | 40 m to 50 m |
| 60 km/h to 40 km/h | 20 m to 40 m |
| 40 km/h to 20 km/h | 10 m to 20 m |
| 20 km/h to 0 km/h | 0 m to 10 m |

It can be learned that the length of the target light pattern is in a positive correlation with the vehicle speed. In other words, a higher vehicle speed indicates a longer target light pattern, and a lower vehicle speed indicates a shorter target light pattern.

For example, if the vehicle determines that the vehicle speed is 70 km/h, the vehicle may determine that the length of the corresponding target light pattern is 45 meters. For another example, if the vehicle determines that the vehicle speed is greater than 120 km/h, the vehicle may determine that the length of the corresponding target light pattern is 80 meters. It should be noted that the description of the correspondence between the vehicle speed and the length of the target light pattern in this embodiment is merely an example, and this is not limited, provided that the vehicle speed can be determined based on the length of the target light pattern.

Manner 2:

In this manner, the control unit may dynamically obtain a corresponding target light pattern based on the vehicle speed.

Specifically, the control unit obtains a current vehicle speed of the vehicle, and obtains, according to the following formula 1, a target light pattern corresponding to the vehicle speed:

$$\text{Length } L \text{ of the target light pattern} = 50 + [(120 - \text{current vehicle speed})/40] \times 10 \quad \text{Formula 1}$$

It can be learned that the control unit may obtain the length of the corresponding target light pattern by substituting the current vehicle speed of the vehicle into the formula 1. It should be noted that the description of the formula 1 described in this embodiment is an optional example, and this is not limited, provided that the control unit can create, based on the formula 1, linear relationships between different vehicle speeds and lengths of different target light patterns.

Optionally, in this embodiment, the vehicle may periodically substitute the current vehicle speed of the vehicle into the formula 1. In a case in which the vehicle determines that a variation of the vehicle speed is greater than or equal to a preset value, the current vehicle speed of the vehicle is substituted into the formula 1, and the like.

It should be noted that, in this embodiment, the vehicle speed is in a positive correlation with the length of the target light pattern. In another example, the vehicle speed may also be in a positive correlation with a width of the target light pattern. In other words, a higher vehicle speed indicates a larger width of the target light pattern, and a lower vehicle speed indicates a smaller width of the target light pattern.

Step 903: The control unit sends the driving instruction to the driving assembly.

The driving instruction in this embodiment indicates the target light pattern.

Step 904: The driving assembly drives, according to the driving instruction, the shielding assembly to move.

In a process in which the driving assembly drives, according to the driving instruction, the shielding assembly to move described in this embodiment, it can be ensured that the second beam emitted from the driving assembly can form a target light pattern on a path. For descriptions of a process in which the driving assembly drives the shielding assembly to move to form the target light pattern, refer to the foregoing embodiment. Details are not described in this embodiment.

Optionally, in this embodiment, the driving assembly may drive, according to the driving instruction, a movable member included in the shielding assembly to move at a uniform speed, to ensure that a shape of the target light pattern can change uniformly in a process of adjusting the target light pattern, thereby avoiding impact of target light pattern transition and sudden change on a driver, another vehicle or person on a path, and improving driving safety.

Step 905: A beam emitted from the shielding assembly is displayed on a path in a target light pattern.

For descriptions of displaying the beam emitted from the shielding assembly on the path in the target light pattern, refer to the foregoing description. Details are not described again.

For better understanding, the following provides descriptions with reference to the example shown in FIG. 10. When the vehicle speed is 50 km/h, the length of the target light pattern indicated by the driving instruction that is sent by the control unit to the driving assembly is 30 meters. As shown in FIG. 10a, the shielding assembly adjusts a length of a target light pattern 1001 to 30 meters under driving of the driving assembly. When the vehicle speed of the vehicle increases to 100 km/h, the length of the target light pattern indicated by the driving instruction that is sent by the control unit to the driving assembly is 60 meters. As shown in FIG. 10b, the shielding assembly adjusts a length of a target light pattern 1002 to 60 meters under driving of the driving assembly.

It should be noted that in this embodiment, an example in which the control unit adjusts a length and/or a width of the target light pattern based on the vehicle speed is used for description, and this is not limited. The following describes several optional manners in which the control unit obtains a target light pattern by using examples.

Example 1

The control unit may determine a target light pattern based on navigation information. Specifically, the navigation information may be a series of plane coordinates for the vehicle to reach a navigation destination. It can be learned that the vehicle can successfully reach the destination after successively passing through the plane coordinates included in the navigation information. The control unit obtains a route to be traveled along by the vehicle. The route to be traveled along by the vehicle includes $i^{th}$ plane coordinates to $j^{th}$ plane coordinates in M coordinates, where i and j are both positive integers, i is greater than or equal to 1, and j is greater than i and less than or equal to M. The control unit determines a shape of the target light pattern based on a form of the route to be traveled along by the vehicle. For example, if the control unit determines that the plurality of plane coordinates included in the route to be traveled along by the vehicle extend along a straight line direction, the control unit determines that the target light pattern is rectangular. For another example, if the control unit determines that the plurality of plane coordinates included in the route to be traveled along by the vehicle extend along an arc direction, the control unit determines that the target light pattern is arc-shaped.

Example 2

The control unit may collect, through a camera of the vehicle, a route to be traveled along by the vehicle that is in front of the vehicle, and determine a target light pattern based on the route to be traveled along by the vehicle. Specifically, the control unit photographs the route to be traveled along by the vehicle by using the camera, to obtain a video stream that includes information about the route to be traveled along by the vehicle. For exemplary descriptions of the camera, refer to FIG. 1. Details are not described again. The control unit receives the video stream from the camera. The control unit extracts video frames included in the video stream, for example, the control unit may extract the video frames from the video stream at a speed of 30 frames per second. It should be noted that, the speed at which the control unit extracts the video frames is not limited in this embodiment. The faster the control unit extracts the video frames, the more likely to obtain the newest information about the route to be traveled along by the vehicle. However, the slower the control unit extracts the video frames, the more power of the processor can be saved.

In an exemplary application, the control unit may determine, based on a complexity of a current road condition, a speed for extracting video frames. For example, if a current traveling road condition is complex (for example, a form of a route to be traveled along by the vehicle changes frequently, and specifically, for example, a vehicle is switched from a straight-going state to a turning state, or there are a large quantity of intersections), the control unit may extract video frames at a high speed. For another example, if the current traveling road condition is simple (for example, the form of the route to be traveled along by the vehicle is stable, and specifically, for example, the vehicle keeps the straight-going state), the control unit may extract video frames at a low speed.

After extracting the video frames, the control unit may perform analysis based on the video frames to obtain the information about the route to be traveled along by the vehicle. An analysis method used by the control unit is not limited in this embodiment. For example, the analysis method may be an object recognition algorithm, a structure from motion (SFM) algorithm, video tracking, or artificial intelligence (AI).

After obtaining the information about the route to be traveled along by the vehicle, the control unit may obtain a target light pattern corresponding to the information about the route to be traveled along by the vehicle. For example, an extension direction of the target light pattern is the same as an extension direction of the route to be traveled along by the vehicle. For another example, a width of the target light pattern is equal to a width of a lane line of the route to be traveled along by the vehicle. In this embodiment, a relationship between the width of the target light pattern and the width of the lane line of the route to be traveled along by the vehicle is described as an optional example. For another example, the width included in a second display attribute may also be less than the width of the lane line. For another example, the width included in the second display attribute may also be greater than the width of the lane line, or the like. This is not specifically limited.

For another example, the length of the target light pattern is equal to a length between a first position and a second position, where the first position is a current location of the vehicle, and the second position is a position of an intersection that is closest to the vehicle and that is included in the route to be traveled along by the vehicle. The second position may be a position of a traffic light closest to the vehicle on the route to be traveled along by the vehicle that is collected by the vehicle.

For another example, if the control unit determines that the route to be traveled along by the vehicle is arc-shaped, a bending direction of the target light pattern is consistent with a bending direction of the lane line of the route to be traveled along by the vehicle.

If the control unit determines that the target light pattern needs to be displayed on the route to be traveled along by the vehicle, the target light pattern further needs to meet the following condition: a center line of the target light pattern may overlap a center line of the route to be traveled along by the vehicle, or an offset between the center line of the target light pattern and the center line of the route to be traveled along by the vehicle is less than or equal to a preset distance. It can be learned that through display of the target light pattern, it is ensured that the target light pattern can be accurately displayed on the route to be traveled along by the vehicle. Alternatively, when the width included in the second display attribute is equal to the width of the lane line of the route to be traveled along by the vehicle, boundary lines on two sides of the target light pattern overlap boundary lines of the lane lines of the route to be traveled along by the vehicle along a transverse direction of the route to be traveled along by the vehicle. Alternatively, when the length indicated by the second display attribute is the length between the first position and the second position, upper and lower boundary lines of the target light pattern respectively overlap the first position and the second position along the extension direction of the route to be traveled along by the vehicle.

Figure 11:
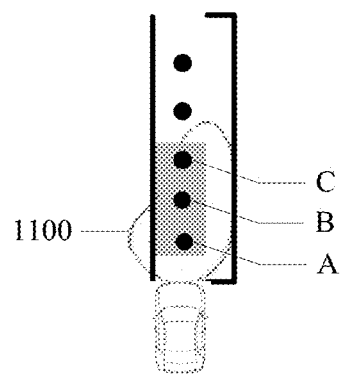
FIG. 11 is a schematic diagram of a third application scenario of a lighting system according to this application.

The target light pattern is displayed on the route to be traveled along by the vehicle, and the target light pattern can indicate a region occupied by the vehicle in a traveling process. It can be learned from a target light pattern 1100 shown in FIG. 11 that the vehicle drives to a lane occupied by the target light pattern 1100. It can be learned that the target light pattern displayed on the route to be traveled along by the vehicle by a beam emitted by the vehicle facilitates improving navigation accuracy, and can implement illumination on the route to be traveled along by the vehicle, thereby ensuring safety of the vehicle in a traveling process based on navigation.

Figure 12:
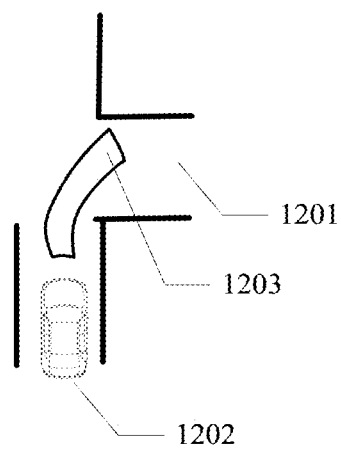
FIG. 12 is a schematic diagram of a fourth application scenario of a lighting system according to this application.

In an example shown in FIG. 12, a control unit of a vehicle 1202 determines that the route to be traveled along by the vehicle indicates that the vehicle needs to turn right at a next intersection 1201. A bending direction of a target light pattern 1203 determined by the control unit is consistent with a bending direction of the route to be traveled along by the vehicle. It can be learned that the target light pattern 1203 can illuminate the intersection 1201 based on the route to be traveled along by the vehicle of the vehicle 1202, to ensure safety of a user driving the vehicle 1202 to pass through the intersection 1201.

In this example, light emitted by a vehicle light has a higher brightness, and thus this example can be applied to a scenario in which the vehicle is in an environment with poor ambient lighting (for example, at night, on a cloudy day, or on a rainy day). An illumination range of light emitted by a low beam of the vehicle 1202 is small. However, the target light pattern in this embodiment is formed by a beam emitted by the vehicle and directly illuminated on a route to be traveled along by the vehicle. In other words, in this embodiment, light (which may also be referred to as a light carpet) displayed on the ground in the target light pattern is described. The brightness of the light carpet is greater than the brightness of the light emitted by the low beam illuminating a path described in an existing solution.

Because the light carpet has illuminated the route to be traveled along by the vehicle, a driver drives based on a region illuminated by the light carpet, thereby improving driving safety. In addition, another person or vehicle on the path can quickly determine, based on an indication of the light carpet, a position at which the vehicle is to travel, so that the another person or vehicle on the path can avoid the vehicle, thereby improving driving safety.

In this example, a width of the light carpet is consistent with a width of the route to be traveled along by the vehicle. In this case, when the width of the route to be traveled along by the vehicle changes, the light carpet displayed by the vehicle also changes correspondingly, to keep the width of the light carpet consistent with the width of the route to be traveled along by the vehicle. Therefore, the driver can accurately determine, based on the route to be traveled along by the vehicle illuminated by the light carpet, a change of the width of the lane line of the route to be traveled along by the vehicle, thereby improving driving safety.

If the route to be traveled along by the vehicle is a zebra crossing, the control unit can control the light carpet to be displayed on the zebra crossing, and the light carpet can illuminate the zebra crossing. In this case, when walking on the zebra crossing, a pedestrian may notice the light carpet. This helps the pedestrian avoid the vehicle on the zebra crossing. In addition, because the light carpet can illuminate the zebra crossing, the zebra crossing does not become a blind region of sight of a driver, thereby effectively avoiding a possibility of a safety accident between the vehicle and a pedestrian.

Example 3

The control unit obtains a width of the vehicle. The width of the light carpet indicated by the driving instruction that is sent by the control unit to the driving assembly is equal to the width of the vehicle. It can be learned that the light carpet can indicate a width occupied in a traveling process of the vehicle. In other words, the light carpet can indicate a width occupied when the vehicle drives to a region of the light carpet. If a pedestrian or another vehicle appears in the light carpet, there is a high probability that a safety accident may occur. If no pedestrian or vehicle appears in the light carpet, there is a low probability that a safety accident may occur.

It can be learned that, in this example, safety in a traveling process of the vehicle can be determined based on the light carpet.

Example 4

In this example, the control unit may send a first driving instruction and a second driving instruction to the driving assembly. The first driving instruction indicates a first light carpet, the second driving instruction indicates a second light carpet, and the first light carpet is different from the second light carpet. It can be learned that the driving assembly drives, according to the first driving instruction, the shielding assembly to move to display the first light carpet on a path, and the driving assembly drives, according to the second driving instruction, the shielding assembly to move to display the second light carpet on a path.

Specifically, the control unit may send the first driving instruction and the second driving instruction to the driving assembly based on a change in the form of the route to be traveled along by the vehicle, to indicate, based on a change between the first light carpet and the second light carpet, the driver that the form of the route to be traveled along by the vehicle changes.

The form change of the route to be traveled along by the vehicle may be: The route to be traveled along by the vehicle of the vehicle indicates switching of the vehicle from a straight-going state to a turning state, or the route to be traveled along by the vehicle of the vehicle indicates switching from a turning state to a straight-going state, or the route to be traveled along by the vehicle of the vehicle indicates that the vehicle is to travel to an intersection, or the route to be traveled along by the vehicle of the vehicle indicates that a dimension of a lane line changes (for example, a width of a lane line changes).

Example 5

Figures 13A, 13B:
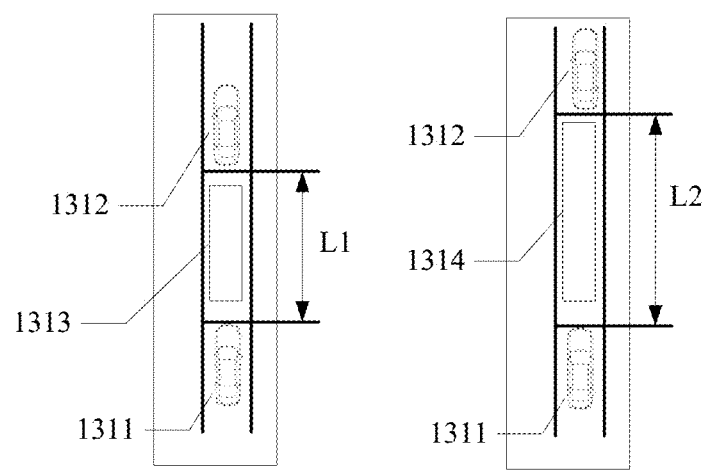
FIG. 13a is a schematic diagram with a first distance between a vehicle and a vehicle in front.
FIG. 13b is a schematic diagram with a second distance between a vehicle and a vehicle in front.

The light carpet determined by the control unit in this example is further related to the distance between the vehicle and a vehicle in front. The vehicle in front is located directly in front of or diagonally in front of the vehicle. With reference to FIG. 13a and FIG. 13b, for example, the vehicle in front is located directly in front of the vehicle. As shown in FIG. 13a, a distance between a vehicle 1311 and a vehicle 1312 in front is L1, and in FIG. 13b, the distance between the vehicle 1311 and the vehicle 1312 in front is L2, where L1 is less than L2. In this example, light emitted by the vehicle 1311 is located on a path between the vehicle 1311 and the vehicle 1312 in front. For example, the light carpet is a rectangle. In other words, in the example shown in FIG. 13a, a rectangular light pattern 1313 is located on a path between the vehicle 1311 and the vehicle 1312 in front. In the example shown in FIG. 13b, a rectangular light pattern 1314 is located on a path between the vehicle 1311 and the vehicle 1312 in front.

A length of the light carpet in this embodiment is in a positive correlation with the distance between the vehicle and the vehicle in front. In other words, a larger distance between the vehicle and the vehicle in front indicates a longer light carpet. Upon comparison between FIG. 13a and FIG. 13b, it can be learned that, when the distance L2 between the vehicle 1311 and the vehicle 1312 in front shown in FIG. 13b is greater than the distance L1 between the vehicle 1311 and the vehicle 1312 in front shown in FIG. 13a, a length of the light carpet 1314 shown in FIG. 13b is greater than a length of the light carpet 1313 shown in FIG. 13a. It should be understood that, when the distance between the vehicle and the vehicle in front is large enough, for example, the distance reaches 150 meters or more, the length of the light carpet remains unchanged.

It should be noted that this embodiment is described by using an example in which the length of the light carpet is in a positive correlation with the distance between the vehicle and the vehicle in front. In another example, the distance between the vehicle and the vehicle in front may be in a negative correlation with a brightness of emitted light displayed on the ground in the form of the light carpet. In other words, a smaller distance between the vehicle and the vehicle in front indicates a higher brightness, and a larger distance between the vehicle and the vehicle in front indicates a lower brightness. For another example, the distance between the vehicle and the vehicle in front is in a negative correlation with a flash frequency of emitted light displayed on the ground in the form of the light carpet. In other words, a smaller distance between the vehicle and the vehicle in front indicates a higher flash frequency, and a larger distance between the vehicle and the vehicle in front indicates a lower flash frequency. Similarly, when the distance between the vehicle and the vehicle in front is large enough, for example, the distance reaches 150 meters or more, the brightness of the emitted light may remain unchanged, and a flash frequency may also remain unchanged or there is no flash.

Example 6

In this example, the control unit obtains the light carpet based on driving assistance information. In this example, the driving assistance information is information about an ADAS of a vehicle. For exemplary descriptions of the ADAS, refer to related descriptions in FIG. 1. Details are not described again. In this example, specifically, the ADAS information may be a driving intention, and the driving intention may be to go straight, change lanes, turn or enter a fork in the road, or the like. The ADAS information may alternatively be an emergency decision, and the emergency decision may be emergency braking, emergency avoidance, a vehicle fault, or the like. The ADAS information may alternatively be a vehicle driving predetermining event, and the vehicle driving predetermining event may be that the vehicle is in a safe state, the vehicle is in a dangerous state, or the like. The control unit determines different light carpets based on different ADAS information, where the different light carpets may be at least one of the following:
different lengths, different widths, different areas, different bending directions, or different bending.

Example 7

In this example, the control unit obtains the light carpet based on head unit data, and the control unit determines different light carpets based on different head unit data. For different light carpets, refer to the foregoing example 6. Details are not described again. The head unit data may be main data (such as fuel consumption, an engine rotation speed, a temperature, and the like) on a vehicle dashboard, steering wheel angle information, or vehicle body attitude data, or the like. It can be learned that by controlling the driving assembly, the control unit indicates the head unit data of the current vehicle to the driver through different light carpets. For example, if fuel consumption of the vehicle is excessively high, an indication is provided for the driver by displaying a light carpet, thereby improving driving safety.

The foregoing embodiments are merely intended for describing technical solutions of this application other than limiting this application. Although this application is described in detail with reference to the foregoing embodiments, a person of ordinary skill in the art should understand that modifications may still be made to the technical solutions described in the foregoing embodiments or equivalent replacements may be made to some technical features thereof. Such modifications and replacements do not cause the essence of the corresponding technical solutions to depart from the spirit and scope of the technical solutions of embodiments of this application.

What is claimed is:

1. A vehicle light device, wherein the vehicle light device comprises a light source assembly, a driving assembly, and a shielding assembly, and the driving assembly is connected to the shielding assembly;
the light source assembly is configured to send a first beam to the shielding assembly, wherein the shielding assembly is located on a transmission optical path of the first beam;
the driving assembly is configured to drive, according to a driving instruction, the shielding assembly to move, to change a relative position between the shielding assembly and the first beam, wherein a second beam emitted from the shielding assembly is displayed on a path around a vehicle in a target light pattern; and
the shielding assembly comprises at least one movable member, at least a part of the first beam is illuminated on the at least one movable member, and a shape of a cross section of the second beam corresponds to the target light pattern, wherein the shielding assembly comprises a first movable member, a second movable member, and a third movable member, the first movable member and the third movable member are located on two sides of the first beam, and the second movable member is located between the first movable member and the third movable member and a relative position between the first movable member and the third movable member corresponds to a bending direction of the target light pattern.

2. The vehicle light device according to claim 1, wherein an overlapping area between the second movable member and a cross section of the first beam corresponds to a length of the target light pattern.

3. The vehicle light device according to claim 1, wherein a sum of an overlapping area between the first movable member and a cross section of the first beam and an overlapping area between the third movable member and the cross section of the first beam corresponds to a width of the target light pattern.

4. The vehicle light device according to claim 1, wherein an overlapping area between the second movable member and a cross section of the first beam is in a negative correlation with a length of the target light pattern.

5. The vehicle light device according to claim 3, wherein the sum of the overlapping area between the first movable member and the cross section of the first beam and the overlapping area between the third movable member and the cross section of the first beam is in a negative correlation with the width of the target light pattern.

6. The vehicle light device according to claim 4, wherein the overlapping area between the second movable member and the cross section of the first beam is in a negative correlation with a vehicle speed.

7. The vehicle light device according to claim 5, wherein the sum of the overlapping area between the first movable member and the cross section of the first beam and the overlapping area between the third movable member and the cross section of the first beam is in a negative correlation with a vehicle speed.

8. The vehicle light device according to claim 1, wherein the target light pattern corresponds to a driving trigger event, and the driving trigger event comprises at least one of the following: navigation information, driving assistance information, and head unit data.

9. The vehicle light device according to claim 1, wherein the target light pattern corresponds to a driving trigger event, and the driving trigger event is at least one of the following:
a form of a route to be traveled along by the vehicle, a dimension of the route to be traveled along by the vehicle, a driving decision of an advanced driving assistance system (ADAS) of the vehicle, a brightness of an environment in which the vehicle is located, or a distance between the vehicle and a neighboring vehicle.

10. The vehicle light device according to claim 1, wherein the target light pattern corresponds to a driving trigger event, the driving trigger event is that there is a to-be-recognized object around the vehicle, the target light pattern covers at least a target region, and the target region is a region occupied by the to-be-recognized object.

11. The vehicle light device according to claim 1, wherein the light device further comprises a lens group, the cross section of the second beam is trapezoidal, the lens group is located on a transmission optical path of the second beam, the lens group is configured to display the second beam on the path in the target light pattern, and the target light pattern is rectangular.

12. The vehicle light device according to claim 11, wherein the trapezoid has a top side and a bottom side, a length of the top side is greater than a length of the bottom side, wherein the shielding assembly comprises a first movable member, a second movable member, and a third movable member, and an included angle between the first movable member and the second movable member and an included angle between the third movable member and the second movable member are both equal to an included angle between a lateral side and the top side of the trapezoid.

13. The vehicle light device according to claim 1, wherein the light device further comprises a reflector, the cross section of the second beam is rectangular, the reflector is located on a transmission optical path of the second beam, the reflector is configured to display the second beam on the path in the target light pattern, and the target light pattern is rectangular.

14. A vehicle, wherein the vehicle comprises a vehicle light device, wherein the vehicle light device comprises a light source assembly, a driving assembly, and a shielding assembly, and the driving assembly is connected to the shielding assembly;
the light source assembly is configured to send a first beam to the shielding assembly, wherein the shielding assembly is located on a transmission optical path of the first beam;
the driving assembly is configured to drive, according to a driving instruction, the shielding assembly to move, to change a relative position between the shielding assembly and the first beam, wherein a second beam emitted from the shielding assembly is displayed on a path around a vehicle in a target light pattern; and
the shielding assembly comprises at least one movable member, at least a part of the first beam is illuminated on the at least one movable member, and a shape of a cross section of the second beam corresponds to the target light pattern, wherein the shielding assembly comprises a first movable member, a second movable member, and a third movable member, the first movable member and the third movable member are located on two sides of the first beam, and the second movable member is located between the first movable member and the third movable member and a relative position between the first movable member and the third movable member corresponds to a bending direction of the target light pattern.

15. The vehicle according to claim 14, wherein an overlapping area between the second movable member and a cross section of the first beam corresponds to a length of the target light pattern.

16. The vehicle according to claim 14, wherein a sum of an overlapping area between the first movable member and a cross section of the first beam and an overlapping area between the third movable member and the cross section of the first beam corresponds to a width of the target light pattern.

* * * * *